United States Patent
Nonoyama et al.

(10) Patent No.: US 6,472,094 B1
(45) Date of Patent: Oct. 29, 2002

(54) SEPARATOR FOR FUEL CELL AND MANUFACTURE THEREOF

(75) Inventors: Fumio Nonoyama; Kenichi Suzuki, both of Aichi-ken (JP)

(73) Assignee: Kabushiki Kaisha Toyota Chuo Kenkyusho, Aichi-gun (JP)

(*) Notice: Subject to any disclaimer, the term of this patent is extended or adjusted under 35 U.S.C. 154(b) by 0 days.

(21) Appl. No.: 09/486,725

(22) PCT Filed: Jul. 9, 1999

(86) PCT No.: PCT/JP99/03755

§ 371 (c)(1),
(2), (4) Date: Mar. 9, 2000

(87) PCT Pub. No.: WO00/03446

PCT Pub. Date: Jan. 20, 2000

(30) Foreign Application Priority Data

Jul. 10, 1998 (JP) .............................. 10-195625

(51) Int. Cl.[7] .............................. H01M 2/14; H01M 8/02
(52) U.S. Cl. .............................. 429/34; 429/38
(58) Field of Search .............................. 429/34, 38

(56) References Cited

U.S. PATENT DOCUMENTS

| | | | |
|---|---|---|---|
| 5,482,792 A | | 1/1996 | Faita et al. |
| 5,565,280 A | * | 10/1996 | Difrancesco ................. 429/34 |
| 5,599,637 A | * | 2/1997 | Pecherer et al. ............... 429/27 |
| 5,716,422 A | | 2/1998 | Muffoletto et al. |
| 5,730,932 A | | 3/1998 | Sarkhel et al. |
| 5,776,624 A | | 7/1998 | Neutzler |
| 5,798,188 A | * | 8/1998 | Mukohyama et al. ......... 429/34 |
| 5,858,567 A | | 1/1999 | Spear, Jr. et al. |
| 5,871,690 A | | 2/1999 | Achari et al. |
| 6,255,012 B1 | * | 7/2001 | Wilson et al. ................ 429/38 |
| 6,291,094 B1 | * | 9/2001 | Yoshimura et al. ........... 429/34 |

FOREIGN PATENT DOCUMENTS

| | | | |
|---|---|---|---|
| JP | 408185870 | * | 7/1996 |
| JP | 11-126620 A | | 5/1999 |

* cited by examiner

Primary Examiner—Stephen Kalafut
Assistant Examiner—Tracy Dove
(74) Attorney, Agent, or Firm—Oblon, Spivak, McClelland, Maier & Neustadt, P.C.

(57) ABSTRACT

The present invention provides a fuel cell separator which is capable of maintaining a low and stable contact resistance at a state of an oxidizing water vapor atmosphere for a long time. The separator 20 has a separator base 22 facing electrodes 14, 16, and there are a plurality of projections 24 on a surface of the separator base 22. AS the projections 24, a Sn—Bi alloy, a Sn—Bi alloy containing Ag or the like are preferable. The separator is produced by adhering a molten bath 32, composed of a Sn alloy, to the separator base 22, then pressing a die 34 with numerous small-holes 34a against the molten bath 32, and then pouring the molten bath 32 into a cavity formed by the base 22 and small-holes 34a.

22 Claims, 18 Drawing Sheets

(a) a cylindrical shape 24b
(b) a prismatic shape 24c
(c) a truncated cone shape 24d
(d) a hemi-spherical shape 24e FIG. 7
(a) 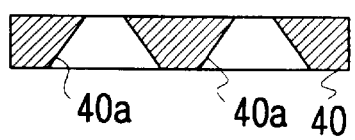
(b) 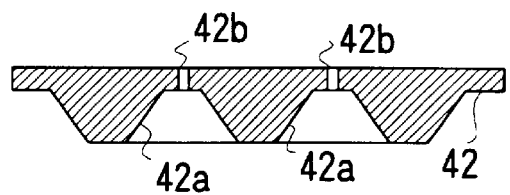
FIG. 8
(a) 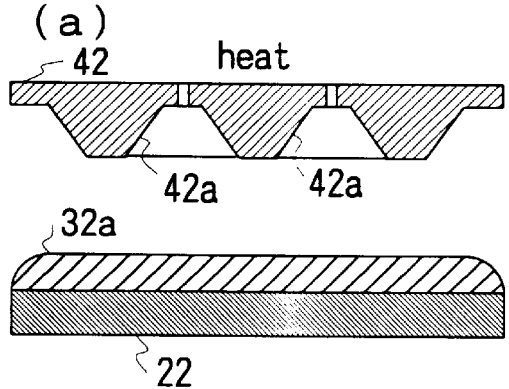
(b) 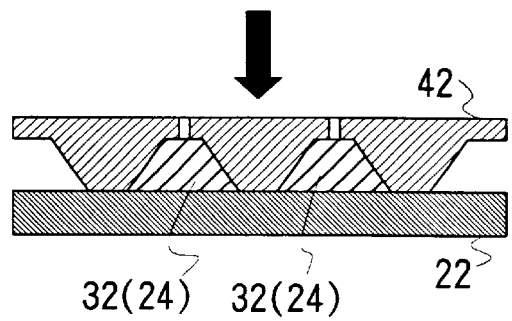
FIG. 9
(a) 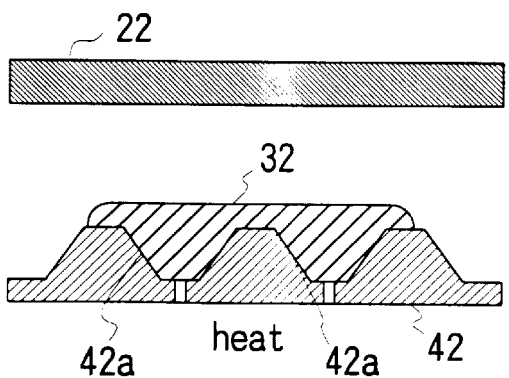
(b) 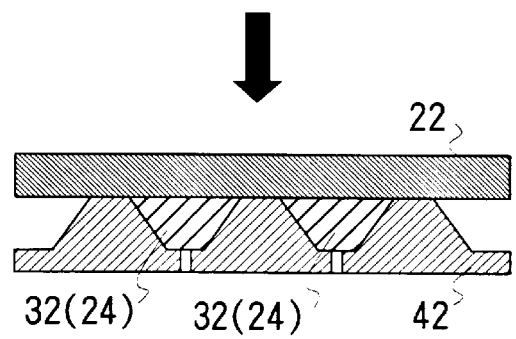

the creep performance held at 80°C

FIG. 24
(a)
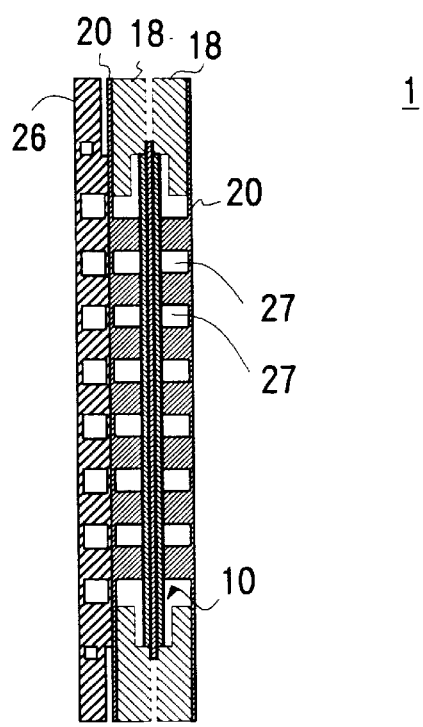
(b)
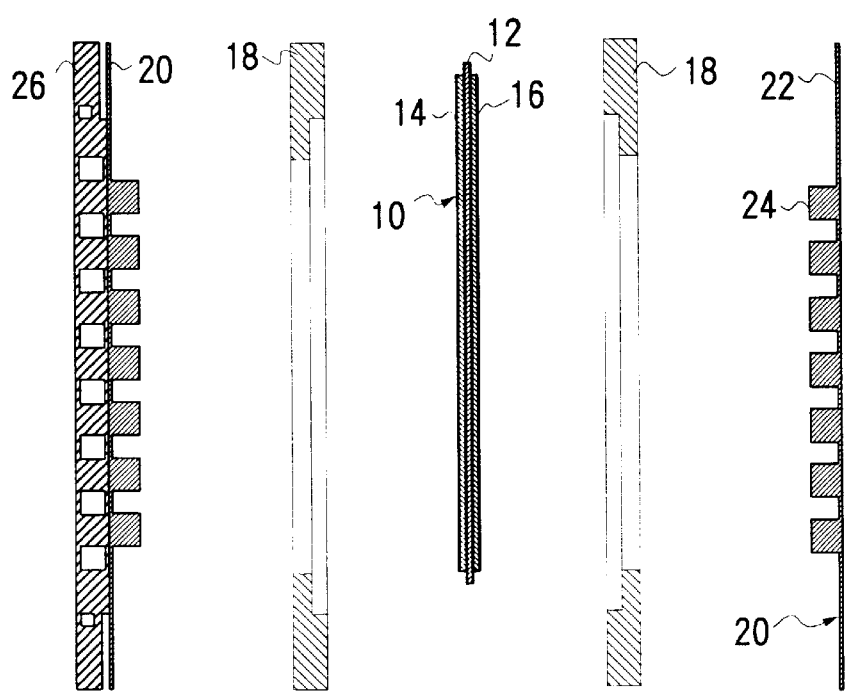

SEPARATOR FOR FUEL CELL AND MANUFACTURE THEREOF

TECHNICAL FIELD

The present invention relates to a fuel cell separator and a method for producing the same, and more particularly to the fuel cell separator and a method for producing the same for use in a contact current-collection and for forming a gas passage.

BACKGROUND OF THE INVENTION

In a solid polymer fuel cell, a solid polymer electrolyte membrane (simply referred to as "an electrolyte membrane" hereinbelow) is used as an electrolyte. The fuel cell has been used for space development and military because of its characteristics such that it has a high output density, its structure is simple, an operating temperature is relatively low, it has quietness and the like. In the case that hydrogen is used as a fuel, the fuel-cell essentially exhausts no nitrogen oxide and no carbon dioxide, thus it has become center of public attention for use as a low-pollution power source for automobile.

FIGS. 24(a) and (b) show an example of a basic structure of a solid polymer fuel cell. A solid polymer fuel cell 1 shown in FIGS. 24(a) and (b) has such basic structure that separators 20, 20 are disposed at both sides of a unit cell 10, which is fixed by separator frames 18, 18 made of an insulating resin material, and a water cooler 26, which controls a cell temperature, is incorporated into one separator 20.

The unit cell 10 is formed by electrodes 14, 16, which are bonded on both surfaces of an electrolyte membrane 12 having a thickness of 50 to 200 $\mu$m. In general, a fluoro polymer electrolyte membrane, typically represented by a perfluoro sulfonic acid membrane, is used as the electrolyte membrane 12, being known under the trade name of Nafion (registered trademark for products manufactured by Du Pont Co.).

In electrodes 14 and 16, one side of a carbon paper or a carbon cloth is coated with mixture of a carbon particle on which platinum or the like is loaded, and a perfluoro sulfonic acid polymer solution. Then, the surface with which the mixture is coated is crimped to the electrolyte membrane 12 to form a membrane-electrode assembly (MEA). The electrodes 14, 16 are composed of two layers, namely, one is a porous and hydrophobic catalyst bed (not shown) composed of a carbon particle on which platinum is loaded, and of an electrolyte, and the other is a porous diffusion layer (not shown) composed of a carbon paper and the like.

In the separator 20, so as to supply process gases to the electrodes 14, 16, which are bonded on both surfaces of the electrolyte membrane 12, there are a great number of isolated or combined projections 24, 24 (simply referred to as "a projection" hereinbelow) on a flat plate-shaped separator base 22, namely, on the surface facing with the electrodes 14, 16. The projection 24 forms a gas passage 27. The separators 20, 20 collect the generated electric power and then take out it to the outside by means of a part in contact with the electrodes 14, 16; the part is formed on the upper surface of the projection 24. Furthermore, the separator 20 prevents fuel gases and oxidants gases from mixing. For the separator 20, therefore, such material as to have gas impermeability and conductivity is employed.

Then, a great number of basic structures shown in FIG. 24(a) are laminated and compressed by the given pressure, and the electrodes 14, 16 are made to be contacted with the projections 24, 24 formed on the surface of the separator 20, 20, whereby the solid polymer fuel cell 1 is produced.

In the solid polymer fuel cell having above-mentioned structure, fuel gases such as reformate gases containing hydrogen flow toward the electrode 14 (anode) and oxidant gases such as air containing oxygen flow toward the electrode 16 (cathode) at a state such that both ends of the solid polymer fuel cell are connected to a load, whereby supplied gases pass through the diffusion layer and reach to the catalyst bed. Then, a hydrogen ion generated at the catalyst bed on the anode 14 moves to the cathode 16 through an electrolyte radical in the electrolyte membrane 12, and reacts with oxygen in the catalyst bed on the cathode 16, whereby water is generated. Electric power generated during reaction collects at the projections 24, 24 in contact with the electrodes 14, 16, then is taken out to the outside through the separators 20, 20 arranged at both ends of the solid polymer fuel cell 1.

The electrolyte membrane 12 employed in a solid polymer fuel cell needs water in order to show conductivity, therefore, process gases supplied to the electrodes 14, 16 are humidified generally. Furthermore, an operation temperature of the solid polymer fuel cell is about 80 to 90° C. Thus, the separators 20, 20 employed in a solid polymer fuel cell are required to have not only excellent gas impermeability and conductivity but also have the stable and low contact resistance even under an oxidizing water vapor atmosphere.

For the fuel cell separator, therefore, a thin plate made of dense carbon graphite that a projection is formed thereon by means of a machine work is employed generally. Furthermore, Japanese Patent Laid-Open No. Hei 4-95354 discloses a separator of which the contact resistance with a carbon matrix electrode is made to be lowered by way of depositing Au, Ta, W, Mo or the like, on the surface of a dense carbon plate.

Additionally, a metallic separator has been also proposed. Taking account of the corrosion resistance and an electric conductivity, for example, stainless steel, Ti, Cu, Al or the like, are employed as a material for a separator. Furthermore, Japanese Patent Laid-Open No. Hei 8-222237 discloses a separator that has a thin plate having a great number of projections spaced at regular intervals of a few millimeters on both surfaces; the projections are formed by processing the thin plate such as to be composed of stainless steel, cold-rolled steel, Al or the like, that are coated with carbon graphite in a process of an embossing or a dimple forming.

Dense carbon graphite has the excellent current-collecting performance and is stable even under an oxidizing water vapor atmosphere, so it is suitable for a material of a separator. Dense carbon graphite, however, is expensive and brittle, and has the poor workability performance. A cutting work was, therefore, only known as a process for forming a projection on a surface of a thin plate composed of dense carbon graphite, thus, mass production was difficult, disadvantageously.

In contrast, a metallic material has more excellent workability than dense carbon graphite, thus a deformation processing such as a press forming may be employed as a simple method for forming a projection thereon.

However, so as to form a great number of projections on a surface of a thin plate by a press forming, a die with high accuracy is required, thereby the increase of expense is induced. In addition to this, if a projection is formed by a press forming, then a thickness of a side wall of a projection is decreased, thus causing micro cracks.

In addition, when inexpensive metal such as stainless steel, cold-rolled steel, Al, or the like, is employed as material for a separator, then an oxide film is generated on a surface of a metallic separator at a state exposed to an oxidizing water vapor atmosphere, whereby the contact resistance between an electrode and a separator is greatly increased. Therefore, the inner electrical resistance is greatly increased, thus causing the energy conversion efficiency to be decreased, disadvantageously.

To overcome this problem, as disclosed in Japanese Patent Laid-Open No. Hei 8-222237, there is such an idea as to coat a surface of a metallic separator with dense carbon graphite by means of processes such as impregnation, thermal spraying, electrocoating, sputtering or the like. According to these processes, however, tightness and adhesiveness of coating are insufficient, thus resulting in poor reliability, disadvantageously. Furthermore, due to a coating process, it results in the increase of the material cost.

The present invention has been made in view of the above circumstances and has an object to overcome the above problems and to provide a fuel cell separator, which is inexpensive and can be mass-produced, and is capable of maintaining the low contact resistance at a state that it is used even under an oxidizing water vapor atmosphere for a long time. Furthermore, the purpose of the present invention is to provide a fuel cell separator such that there is no danger of leakage of process gases.

Another object of the present invention is to provide a fuel cell separator, which can maintain the creep strength at a high level, and such that there is no deterioration in the cell performance due to a fall of a contact pressure between a carbon cloth and an electrode, furthermore, also there is no gas leakage due to a fall of a seal pressure of a gas seal portion, even under a condition that an operating temperature of the fuel cell is over 80° C., for instance, for use in a power source for automobile.

DISCLOSURE OF THE INVENTION

To overcome the above-identified problems, the first aspect of the present invention resides in that the fuel cell separator is arranged so as to face with an anode formed on one side of a solid polymer electrolyte or a cathode formed on an opposite side of a solid polymer electrolyte, wherein a contact part, for use in a contact current-collection and for forming a gas passage, and formed on a facing plane between a separator base and said electrodes, is composed of Sn or Sn alloys.

According to the fuel cell separator having above-identified structure, fuel gases flow on a surface of an anode, and oxidants gases flow on a surface of a cathode, whereby the electrochemical reaction is caused between the anode and the cathode through a solid polymer electrolyte, then the resulting generated-current is collected through a contact part formed on the separator base, then is taken out to the outside. The separator of the present invention has the excellent electric conductivity and corrosion resistance because the contact part thereof is composed of Sn or Sn alloys.

Additionally because a Sn oxide has conductivity, the stable and low contact resistance can be maintained even if the separator is driven under an oxidizing water vapor atmosphere for a long time.

In this case, as a Sn alloy material, for instance, taking account of the corrosion resistance, the heat resistance and the like, a Sn—Ni alloy, a Sn—Fe alloy, a Sn—Ti alloy, a Sn—Bi alloy, a Sn—Ag alloy, a Sn—Sb alloy, a Sn—zn alloy, a Sn—In alloy, or the like may satisfactorily be employed. Alternatively, Sn containing at least two kinds of elements selected from Ni, Fe, Ti, Bi, In, Ag, Sb and Zn may satisfactorily be employed. Among them, a Sn—Bi alloy is particularly preferable because the contact resistance of an electrode surface shows little change with increasing time.

Furthermore, it is preferable to compose a contact part, which is formed on a surface of a separator base, of a Sn—Bi alloy containing Ag. In this case, the creep strength can be maintained at a high level and there is no fall of a contact pressure at an electrode surface, even under a condition that an operating temperature of the fuel cell is over 80° C., whereby the excellent cell performance is maintained. Additionally, gas leakage due to a fall of a seal pressure may also be avoided.

In this case, Bi content of a Sn—Bi alloy which forms the Sn based alloy is preferably in the range of 3 to 20 wt %, furthermore, the amount of Ag added to a Sn—Bi alloy is preferably in the range of 0.5 to 5 wt %. If Bi content is 3 wt % or less, then change with increasing time of the contact resistance on the electrode surface cannott be suppressed sufficiently. While, if Bi content is 20 wt % or more, then such increase causes no improvement. Furthermore, if the amount of addition of Ag is 0.5 wt % or less, the creep strength can not be retained under a condition of a high temperature (more specifically, more than or equal to 60° C.), and if the amount is 5 wt % or more, then such increase causes no improvement.

The reason why a process of adding Ag to a Sn—Bi alloy allows the creep strength to be maintained even under a condition of a high temperature is considered that not only Bi but also an intermetallic compound such as $Ag_3Sn$ is dispersed in a Sn matrix. In stead of Ag, therefore, Cu, Al or Sb may also be applied, because these metals have the excellent electric conductivity and corrosion resistance and form an intermetallic compound with Sn.

More specifically, in case of an above-mentioned Sn—Ag alloy, Ag content is preferably in the range of 0.5 to 5 wt %, in case of a Sn—Sb alloy, Sb content is preferably in the range of 2 to 10 wt %, in case of a Sn—In alloy, In content is preferably 0.1 to 2 wt %. Furthermore, in case of a Sn—Zn alloy, the adding amount of Zn is preferably in the range of 15 to 25%.

The second aspect of the present invention resides in that the method for producing a fuel cell separator, which is arranged so as to face with an anode or a cathode formed on one side or an opposite side of a solid polymer electrolyte, comprises a step of making a contact part of Sn or a Sn alloy by a process of a die press, said contact part being arranged on a facing plane between a separator base and said electrodes, and said contact part being for use in a contact current-collection and for forming a gas passage.

As a method for forming a gas passage by means of a process of a die molding, variety of processes may satisfactorily be employed. For instance, preference is given to a process of flowing a molten-Sn alloy on a surface of a separator base, then pressing it by means of a die in that state, to form a gas passage wall; a process of flowing a molten-Sn alloy on a surface of a die, then pressing it by means of a separator base in that state, to form a gas passage wall; or a process of pressing a die for use in forming a gas passage wall against a flat surface of a separator base in advance, then flowing a molten-metal from a molten-metal injection hole in the die to a surface of a separator base.

According to the method for producing a fuel cell separator of the present invention, a fuel gas passage and/or an oxidants gases passage, and/or a part in contact with an electrode can readily be formed at a time on a surface of a separator base by a process of a die molding of a Sn or Sn alloy material. Additionally, the method of the present invention achieves higher yield and shorter processing time than a machine working. Furthermore, a die employed for the present invention is not required to have accuracy as high as that for use in a press forming, therefore, it is possible to produce a fuel cell separator at a low cost and to mass-produce the same, advantageously.

Furthermore, because the inside of the partition walls of the resulting passage is not a cavity, there is no danger of leakage of process gases, unlike the metallic separator produced from a thin plate.

Alternatively, the method of the present invention may be realized by forming a coating layer of Sn or a Sn alloy by a process of a metal-plating on a surface of a contact part formed on a facing plane between a separator base and an electrode. For example, so as to form a layer composed of a Sn—Bi alloy on a projection of a separator base, a Sn—Bi alloy (layer) may satisfactorily be formed by means of processes such as a molten metal-plating, an electroplating or the like. In case of an electroplating, it is required that a porous layer has to be dense by reflowing a plated layer. The reason is that if the layer is porous, as it is, then water vapor penetrates therethrough to accelerate oxidization of the separator under a working operation with the increase of the contact resistance, disadvantageously. Alternatively, Sn and Bi may respectively be plated in order on the surface, then the resulting material may satisfactorily be reflowed so as to make it dense and to form an alloy at a time. In this case, the order of a Sn plating and a Bi plating is not a problem.

BRIEF DESCRIPTION OF THE DRAWINGS

FIGS. 7(a) and 7(b) are cross sectional views showing examples employed for the method shown in FIGS. 6(a) to 6(d);

FIGS. 8(a) and 8(b) are schemes depicting the process of the second method for producing the fuel cell separator of the present invention;

FIGS. 9(a) and 9(b) are schemes depicting the process of the third method for producing the fuel cell separator of the present invention;

FIG. 24(a) is a cross sectional view showing an example of a basic structure of a solid polymer fuel cell, and FIG. 24(b) is an exploded cross sectional view with respect to the basic structure shown in FIG. 24(a)

BEST MODE FOR CARRYING OUT THE PRESENT INVENTION

Hereinafter, a detailed description of one preferred embodiment of the present invention will now be given, referring to the accompanying drawings. The fuel cell separator of the present invention is composed of a separator base in a shape of a flat plate (simply referred to as "a base" hereinbelow) and a great number of projections formed on the base. The base may satisfactorily be made of a metal material, which has the excellent corrosion resistance, thus the material thereof is not specifically limited. More specifically, for example, stainless steel, Ti, Cu, Al and an alloy composed of these ones are preferable.

Additionally, as the projections formed on the base, Sn or a Sn alloy is employed. In the preferred embodiment, more specifically, a Sn-3% Bi alloy, a Sn-10% Bi alloy, or the like are employed other than a pure Sn. As for a Sn-10% Bi alloy, furthermore, the following three kinds of alloys are employed: an alloy prepared by adding 0.5 wt % of Ag thereto (Sn-10Bi-0.5Ag), an alloy prepared by adding 1 wt % of Ag thereto (Sn-10Bi-1Ag), and an alloy prepared by adding 2 wt % of Ag thereto (Sn-10Bi-2Ag).

A Sn—Bi based alloy is preferable as a material for composing a projection, because change with increasing time of the contact resistance of a Sn—Bi based alloy is less than that of other Sn alloys even if a Sn—Bi based alloy is used under a condition of an oxidizing water vapor atmosphere for a long time. Additionally, by a process of adding Ag to a Sn—Bi alloy, not only Bi but also an intermetallic compound such as $Ag_3Sn$ is dispersed in a Sn matrix, thus allowing the creep strength to be retained at a high level even if an operation temperature is over 80° C.

More specifically, the projection may satisfactorily be formed by Sn or a Sn alloy in a body, and its shape may not specifically be limited. For example, the shape may satisfactorily be any of the isolated projections such as a cylindrical shape, a prismatic shape, a truncated-cone shape, a hemi-spherical shape, or the like, or a rib shape that are combined-projections arranged in parallel. Furthermore, the end of the projection may satisfactorily be in a hemispherical shape (a swelling shape), or in a flat shape.

Figure 1:
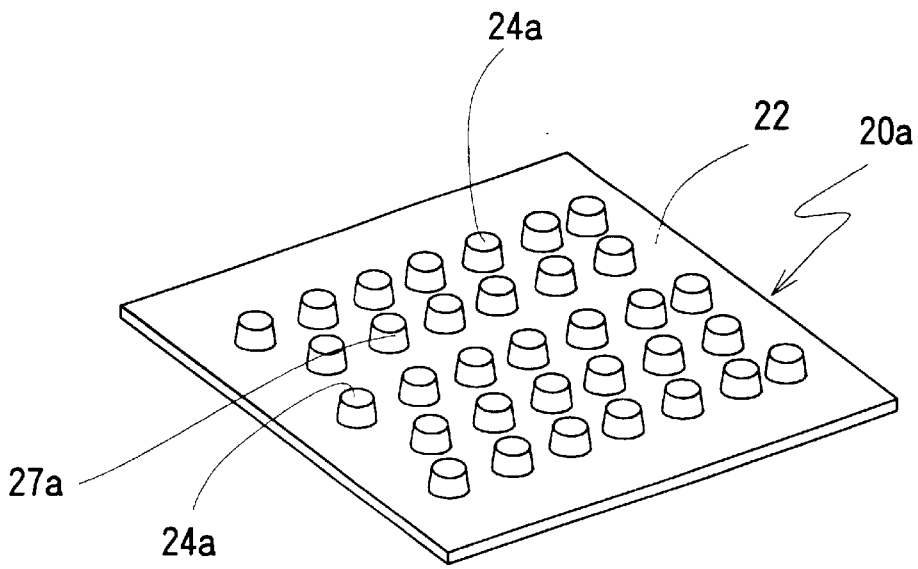
FIG. 1 is an outer schematic view showing the fuel cell separator of the preferred embodiment of the present invention.

For example, FIG. 1 shows a separator 20a on which isolated projections 24a, 24a in a shape of a truncated-cone are spaced at given intervals (pitches) crosswise and alternately. The separator 20a and aforementioned electrode 14 (or 16) are faced in layers to form a gas passage 27a between respective projections 24a, 24a.

Figure 2:
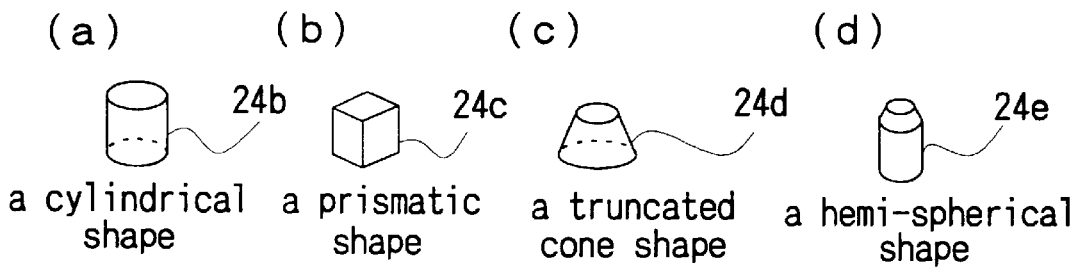
FIGS. 2(a) to 2(d) show various kinds of projections, formed on the surface of the separator base of the fuel cell separator, shown in FIG. 1.

Alternatively, a cylindrical-shaped projection 24b as shown in FIG. 2(a), a prismatic-shaped projection 24c as shown in FIG. 2(b), a hemi spherical-shaped projection 24d as shown in FIG. 2(c), a projection 24e having a cylindrical portion with a hemi-spherical or swelling shaped end as shown in FIG. 2(d), or the like can be employed in stead of the projections 24a, 24a formed on the separator 20a shown in FIG. 1.

Figure 3:
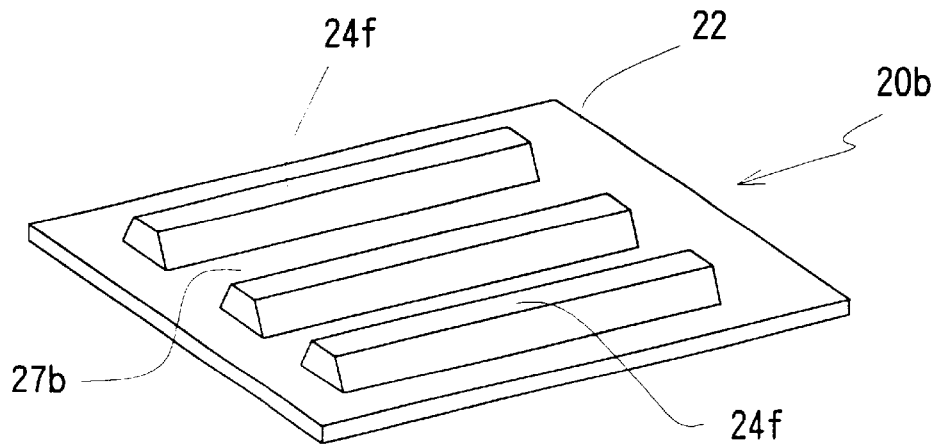
FIG. 3 is an outer schematic view showing the fuel cell separator of another preferred embodiment of the present invention.

Furthermore, FIG. 3 shows a separator 20b having the separator base 22 on which projections 24f, 24f in a shape of a rib are arranged in approximately parallel, to form a gas passage 27b between respective projections 24f, 24f.

So as to prevent water generated by the cell reaction from remaining in the separator and so as to discharge the generated water efficiently, it is more preferable to arrange a great number of isolated projections to be spaced at given intervals than to arrange the combined-projections. Additionally, to perform a contact current-collection efficiently, an end of the projection may be preferably in a flat shape.

Furthermore, the cross sectional area and the height of a projection, and the number, the arrangement, the interval of a projection on a base, or the like may be determined so that the cell may show the highest performance in terms of the supply efficiency of process gases to an electrode, the current-collecting efficiency, the drain efficiency of process gases. If the projection is in a cylindrical shape or in a prismatic shape, then a diameter or a side length of a projection is preferably be in the range of 1 to 2 mm. Additionally, each space between each projection is preferably in the range of 0.5 to 1.5 mm. More specifically, a ratio of an area of an upper face of a projection defined by "a sum of a contact area between each projection and an electrode/ an area of a separator base where the projection is formed" is preferably in the range of 25 to 50%. In this case, a height of each projection is preferably in the range of 0.2 to 1.0 mm, particularly preferably approximately 0.5 mm. Furthermore, as an arrangement of projections, as shown in FIG. 1 as described above, it is preferable to arrange crosswise (alternatively) taking account of the supply efficiency of process gases and the current-collecting efficiency.

Additionally, with respect to a projection formed on a surface of the separator base, Sn or a Sn alloy may be employed only to form the projection, and other metal may be employed to form the base, however, alternatively, both the base and the projection may be formed by Sn or a Sn alloy in a body.

Figure 4:
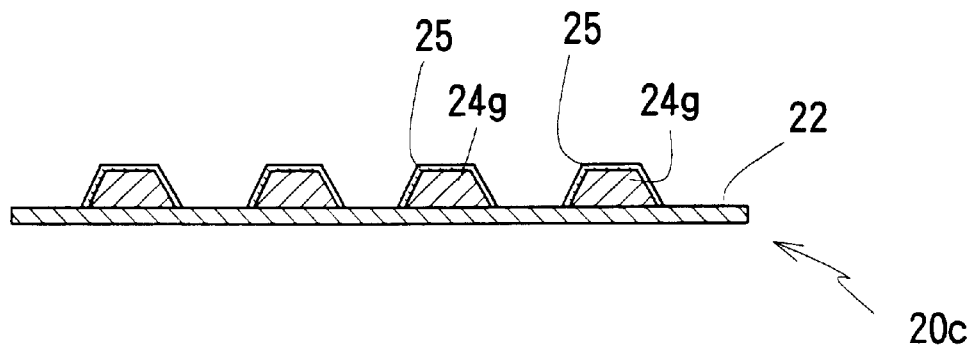
FIG. 4 is a cross sectional view showing another preferred embodiment of the present invention.
Figure 5:
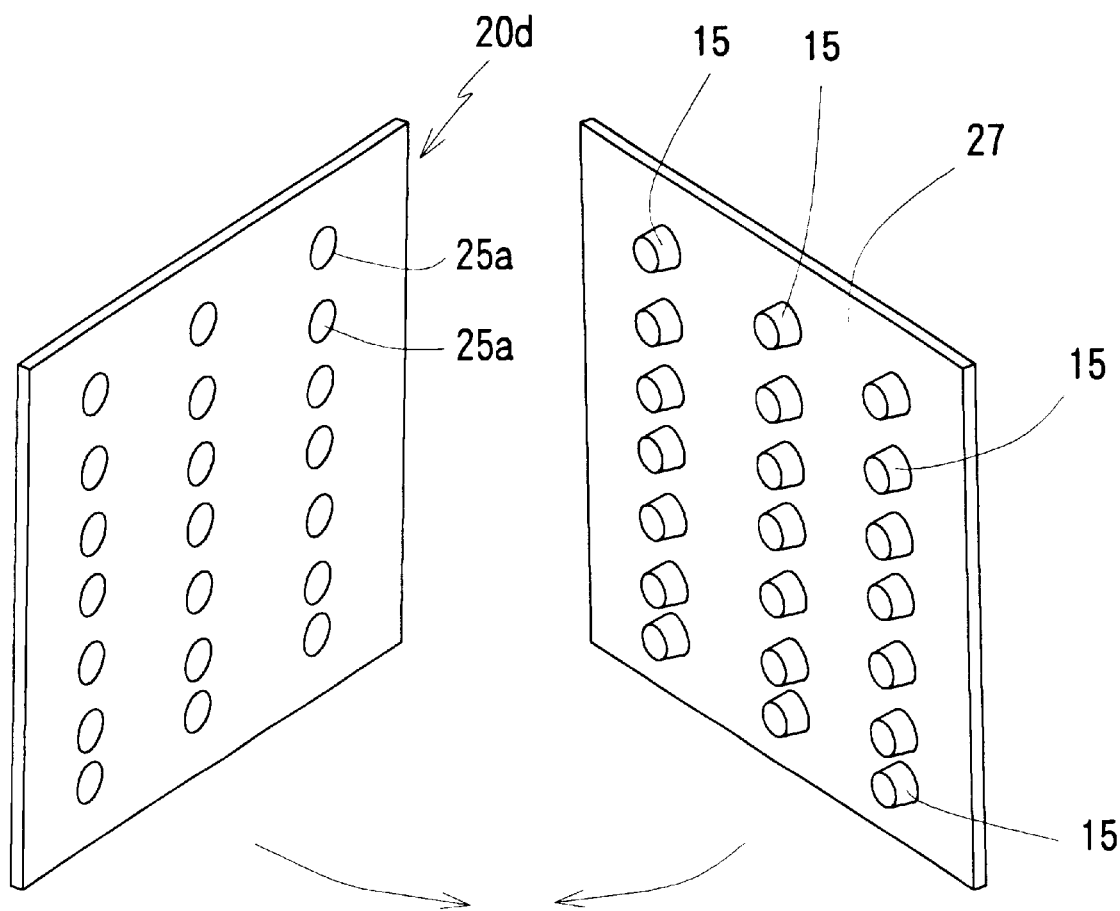
FIG. 5 is an outer schematic view showing the fuel cell separator of another preferred embodiment of the present invention.

Furthermore, when a Sn—Bi based alloy is used, in particular, as described above, all projections may be composed of a Sn—Bi based alloy. As FIG. 4 shows a cross sectional structure of another separator 20c, however, projections 24g, 24g may be composed of another material, such as Cu and Al, on the surface of the separator base 22, then at least ends thereof in contact with an electrode may be coated with a Sn—Bi based alloy to form coating layers 25, 25 composed of a Sn—Bi based alloy. Alternatively, as shown in FIG. 5, projections 15, 15, a gap, and the like are arranged in the side of the electrode 14 (or 16) in order to form the gas passages 27, and the separator 20d is to be in a shape of a flat plate, further at least a face in contact with an electrode within the separator surface may satisfactorily be coated with a Sn—Bi based alloy to form a coating portion 25a, 25a composed of a Sn—Bi based alloy.

Next, the operation of the fuel cell separator of the present invention will be described hereinafter. The fuel cell separator of the present invention has the base, on which there are a great number of projections composed of Sn or a Sn alloy, and an inside of the projections is not a cavity. Therefore, unlike a metallic separator having projections out of a thin plate by a process of a press forming, no thin portion is produced, thus there is no danger of leakage of process gases.

Additionally, if the fuel cell separator is only composed of a metal such as stainless steel, Cu, Al or the like, then a part in contact with an electrode is exposed to an oxidizing atmosphere due to water vapor of a high temperature during the fuel cell operation, whereby an oxide film is formed on the part in contact with the electrode. The contact resistance between the separator and the electrode is increased, thus causing the current-collecting efficiency to be decreased.

In contrast, Sn or an alloy containing Sn has the excellent electric conductivity and corrosion resistance. If at least a projection in contact with an electrode within the fuel cell separator is composed of Sn or a Sn alloy, then the contact resistance with an electrode shows a low level as the same as that of a dense carbon graphite. Additionally, a Sn oxide has the electric conductivity, therefore, even if it is used for a long time under a condition of an oxidizing water vapor atmosphere, then the contact resistance shows little change with increasing time, whereby the current collecting-efficiency can be maintained to be high.

A method for producing the fuel cell separator of the present invention will be described hereinbelow. A variety of processes may be employed as the method for preparing the fuel cell separator of the present invention, for example, it can be also produced according to a conventional process of a press forming. In case of applying the separator for automobile or the like, however, such a method that is capable of mass-producing the fuel cell separator at a low cost is preferably. Particularly, preference is given to a process, comprising adhering a die with small holes closely to a base, then flowing a molten Sn or a molten Sn alloy into a cavity formed by the base and the holes, to form a projection. More specifically, the fuel cell separator can be produced as following.

Figure 6:
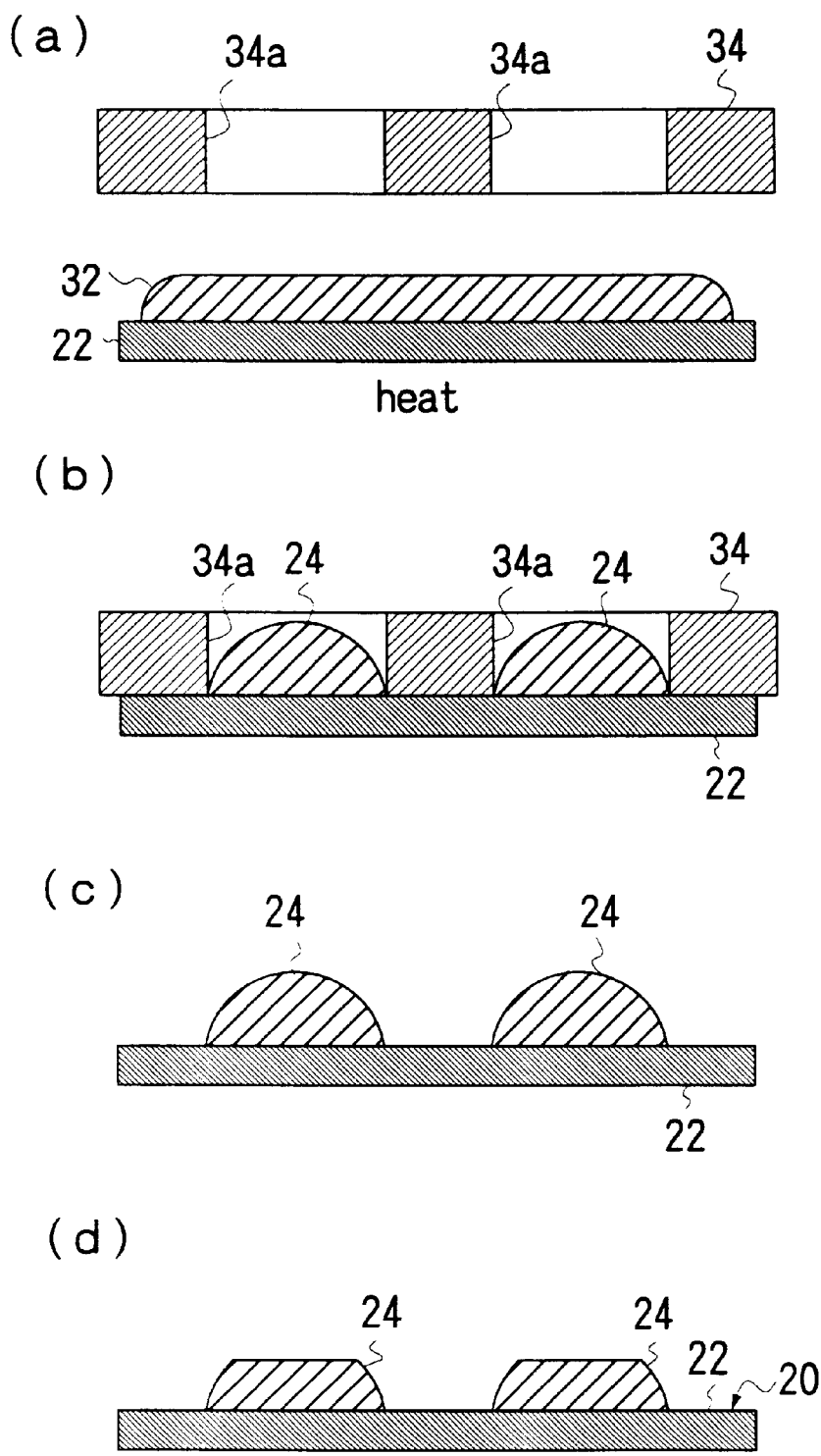
FIGS. 6(a) to 6(d) are schemes depicting the process of the first method for producing the fuel cell separator of the present invention.

FIGS. 6(a), (b), (c) and (d) show the process of the first method for producing the fuel cell separator of the present invention. As shown in FIG. 6(a), the first process of the method includes steps of heating the base 22, then adhering the molten metal 32 composed of Sn or a Sn alloy to the upper face of the base 22. Furthermore, above the base 22, a die 34 with a great number of straight through-holes 34a, 34a is made to be on the standby. In case of bad wettability between the base 22 and Sn or a Sn alloy, such a process as to improve wettability of the surface of the base 22, for example, a Ni coating or the like, may preferably be given in advance. Additionally, as the die 34, no wet material against Sn or a Sn alloy, such as stainless steel, or such a material as to be processed so as not to be wet may be employed.

Next, the die 34 is pressed to the molten metal 32 composed of Sn or a Sn alloy on the base 22. If the die 34 is adhered closely to the molten metal 32, then the molten metal 32 on the base 22 flows into the through-holes 34a, 34a formed on the die 34, thus allowing the molten metal composed of Sn or a Sn alloy to swell hemispherically, to form the projections 24, 24. The appearance is shown in FIG. 6(b).

After solidification of the projections 24, 24, the base 22 on which the projections 24, 24 are formed is produced by removing the die 34. The appearance is shown in FIG. 6(c). Then, by flattening the end of the projections 24, 24 by a process of a press forming or a machine working, the fuel cell separator 20 shown in FIG. 6(d) is produced.

Alternatively, in case of using the first method, as shown in FIG. 7(a), the die 40 having through-holes 40a, 40a with draft may also satisfactorily be employed. Alternatively, as shown in FIG. 7(b), the die 42 having closed-holes 42a, 42a with draft may also satisfactorily be employed. In this case, micro-holes 42b, 42b used for purging gases may additionally be formed on the base of the closed-holes 42a, 42a, so that the molten metal may flow into the closed-holes 42a, 42a smoothly.

Next, the second method for producing the fuel cell separator of the present invention will be described hereinbelow. The fuel cell separator 20 can be produced by the process similar to the first method, other than that the die is heated instead of heating the base 22.

More specifically, as shown in FIG. 8(a), the die 42 having closed-holes 42a, 42a with draft shown in FIG. 7(b) is arranged above the base 22 to which a solid Sn or solid Sn alloy 32a is adhered, then the die 42 is adhered to a solid Sn or solid Sn alloy 32a on the base 22 by heating the die 42.

When the heated die 42 is adhered to a solid Sn or solid Sn alloy 32a, then a solid Sn or Sn alloy 32a melts due to the heat of the die 42, thus being the molten metal 32. Then, by pressing the die 42 to the base 22, as shown in FIG. 8(b), the base 22 is closely adhered to the die 42, whereby the cavity formed by the closed-holes 42a, 42a and the base 22 are filled with the molten metal 32.

After that, by solidifying the molten metal 32, then removing the die 42 and flattening the end of the projection 24 formed on the base 22, whereby the fuel cell separator 20 is produced; which is the case with the first method. In this case, the die 40 having a great number of the through-holes 40a, 40a with draft, or the die 34 having the through-holes 34a, 34a with no draft may satisfactorily be employed instead of the die 42 having the closed-holes 42a, 42a.

Next, the third method for producing the fuel cell separator of the present invention will be described hereinbelow. At first, the die 42 having the closed-holes 42a, 42a with draft shown in FIG. 7(b) is arranged with its face upward, then Sn or a Sn alloy being put on the die 42 is heated, whereby Sn or a Sn alloy melts to form the molten metal 32, thereby the closed-holes 42a, 42a are filled with a part of the molten metal 32. The appearance is shown in FIG. 9(a).

Succeedingly, when the base 22 is pressed down above the die 42, then the die 42 is closely adhered to the base 22, thereby the excessive molten metal 32 is removed and the molten metal 32 is forced into the closed-holes 42a, 42a, whereby the surface of the molten metal 32 is further pressed closely to the base 22. The appearance is shown in FIG. 9(b). After that, by solidifying the molten metal 32, then removing the die 42 and flattening the end of the projection 24 formed on the base 22, whereby the fuel cell separator 20 is produced; which is the case with the first method.

Figure 10:
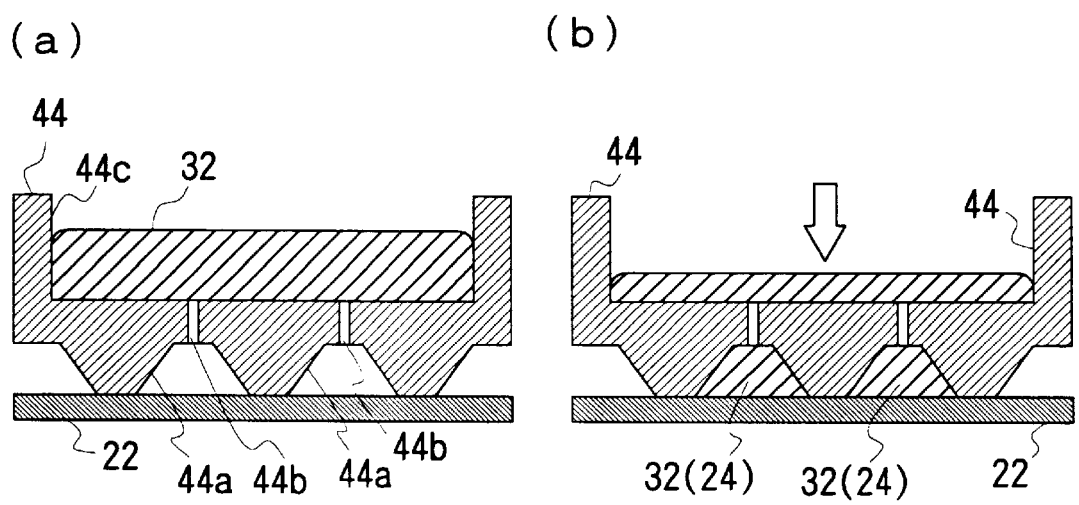
FIGS. 10(a) and 10(b) are schemes depicting the process of the fourth method for producing the fuel cell separator of the present invention.

Next, the fourth method for producing the fuel cell separator of the present invention will be described hereinbelow. A die 44 employed for the fourth method has the end having closed-holes 44a, 44a with draft as shown in FIG. 10(a). Inside the die 44, a storage vessel 44c which reserves the molten metal 32 composed of Sn or a Sn alloy is arranged, and the closed-holes 44a, 44a are connected with the storage vessel 44c through the connecting-pores 44b, 44b.

As shown in FIG. 10(a), the end of the die 44 is adhered to the base 22 in the state that the storage vessel 44c is filled with the molten metal 32; then themolten metal 32 is forced into the cavity, which is formed by the base 22 and the closed-holes 44a, 44a, by pressurizing the molten metal 32 in the storage vessel 44c. FIG. 10(b) shows this state. After that, by solidifying the molten metal 32, then removing the die 42 and flattening the end of the projection 24 formed on the base 22, whereby the fuel cell separator 20 is produced; which is the case with the first method.

Next, the fifth method for producing the fuel cell separator of the present invention will be described hereinbelow. A die 40 employed for the fifth method has the same structure as the die 40 shown in FIG. 7(a), and has a great number of through-holes 40a, 40a with draft. Additionally, an injection die 46 is employed for injecting the molten metal 32. The injection die 46 is provided with a storage vessel 46a, which opens at a face in contact with the die 40, so that the molten metal 32 may be reserved.

Figure 11:
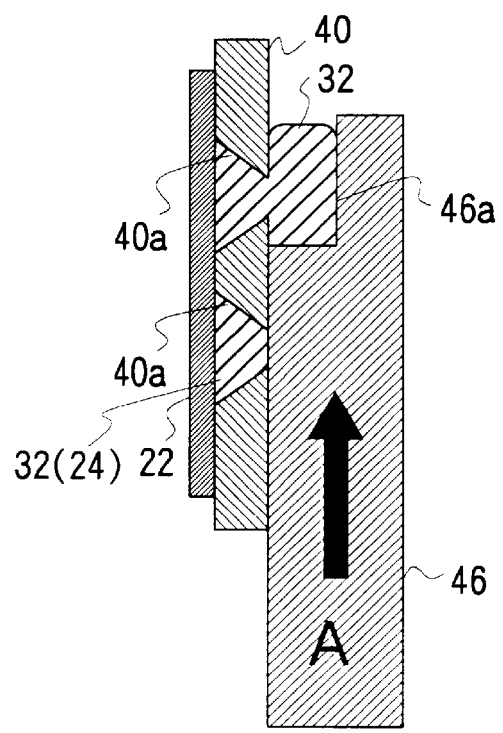
FIG. 11 is a scheme depicting the process of the fifth method for producing the fuel cell separator of the present invention.

Then, as shown in FIG. 11, the base 22 arranged perpendicularly is closely adhered to the die 40, and the opening part of the storage vessel 46a provided for the injection die 46 is closely adhered to the back face of the die 40, then the storage vessel 46a is filled with the molten metal 32. Succeedingly, when the injection die 46 is slid in the direction of an arrow A in FIG. 10, then the through-holes 40a, 40a are filled with the molten metal 32 out of the storage vessel 46a.

After that, by solidifying the molten metal 32, then removing the die 40 and flattening the end of the projection 24 formed on the base 22, whereby the fuel cell separator 20 is produced; which is the case with the first method. In this case, the die 34 having the through-holes 34a, 34a with no draft shown in FIG. 6 may be employed instead of the die 40 having a great number of the through-holes 40a, 40a with draft.

Next, the sixth method for producing the fuel cell separator of the present invention will be described hereinbelow. The sixth method for producing the fuel cell separator is to form the projection 24 on both surfaces of the base 22, by using the two dies 42 having the closed-holes 42a, 42a with draft shown in FIG. 7(b).

Figure 12:
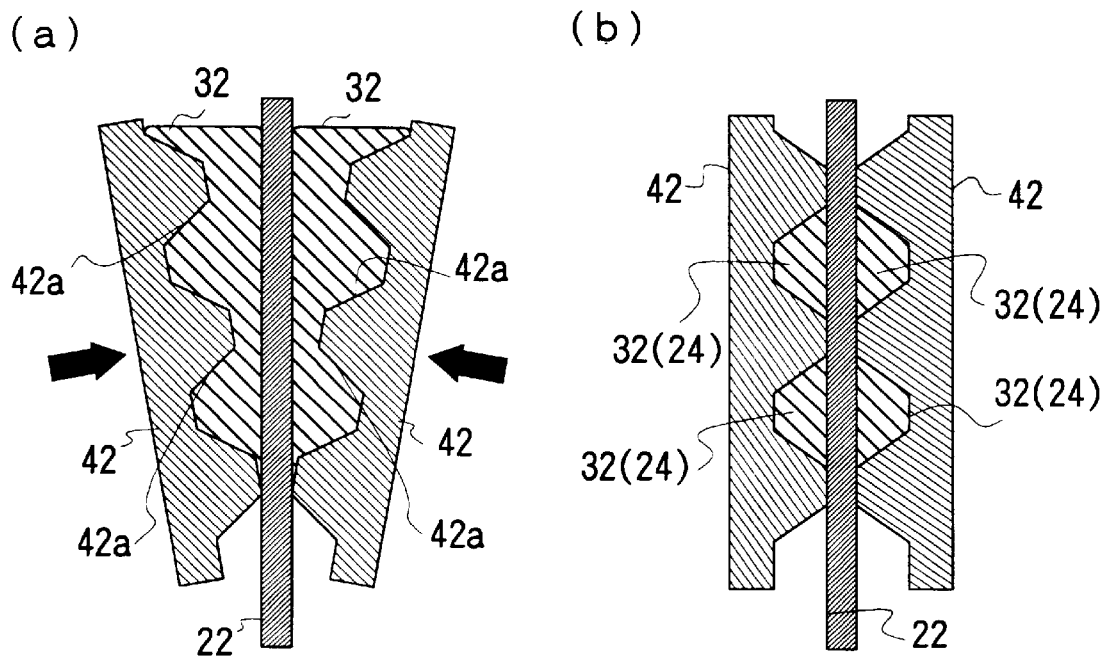
FIGS. 12(a) and 12(b) are schemes depicting the process of the sixth method for producing the fuel cell separator of the present invention.

More specifically, the base 22 is arranged perpendicularly, and is adhered closely only to the lower end of the dies 42, 42, whereby the base 22 is supported by the lower end of the two dies 42, 42. Then, as shown in FIG. 12(a), the v-space formed by the base 22 and the dies 42, 42 is filled with the molten metal 32. Then, as shown in FIG. 12(b), the two dies 42 are adhered to the base 22 by shutting the upper part of the two dies 42, 42, thereby the cavity formed by the base 22 and the closed-holes 42a, 42a is filled with the molten metal 32. After that, by solidifying the molten metal 32, then removing the dies 42 and flattening the end of the projection 24 formed on the base 22, whereby the fuel cell separator 20 is produced; which is the case with the first method.

Alternatively, by using the second, the third, the fourth, or the fifth methods, the projection 24 can be formed on both faces of the base 22. In case of employing the second method, a solid Sn or solid Sn alloy 32a is closely adhered to both faces of the base 22 and the die 42 is arranged on both faces of the base 22; then the projections 24 are formed by the same procedures as in case of one side face. In case of employing the fourth method, the die 44 is arranged on both faces of the base 22, and in case of employing the fifth method, the die 40 and the injection die 46 are arranged on both faces of the base 22, then the projections 24 are formed by the same procedures as in case of one side face.

As has been described above, according to the method comprising adhering the base closely to the die with small-holes, such as through-holes, closed-holes or the like, and causing the molten metal composed of Sn or a Sn alloy to flow into the cavity formed by the base and the small-holes, whereby a great number of projections composed of Sn or a Sn alloy may readily be formed at a time on the base. Additionally, the method of the present invention achieves higher yield and shorter processing time than a machine working. Therefore, the fuel cell separator can be produced at a low cost, and mass-production is also possible, advantageously.

Furthermore, because all projections are composed of Sn or a Sn alloy, flatness of a projection's upper face that is necessary for a contact current-collection may readily insured by a process of a press forming or a machine working. Furthermore, a die employed for forming a projection does not require accuracy as high as a die for use in a press forming, thus the die expenses may be reduced, advantageously.

Additionally, the method for forming the projection, the inside of which is not cavity, on the base is not specifically limited, and other method may be used. For example, a forging (embossing) may be employed in order to form the projection on the base, by using a base with a Sn or Sn alloy layer having a given thickness, or by using a base composed of Sn or a Sn alloy. Alternatively, powder of Sn or a Sn alloy is formed to be like pellet, then the projection is formed by putting the resulting material on the base and then sintering the same.

Furthermore, alternatively, the projection may be satisfactorily formed by covering the face of the base with a mask having small holes, then coating the surface of the base which is exposed from the small holes, with a thick film composed of Sn or a Sn alloy by a process of a thermal spraying, an electric casting or the like, to form the projections. Alternatively, the projections may satisfactorily be formed by preparing a pin composed of Sn or a Sn alloy, then fixing the pin to the base by a process of a welding, a soldering, a caulking or the like.

Alternatively, a plating (for example, an electroplating) may be also employed as another method for producing the fuel cell separator of the present invention. For example, the method for producing the separator 20c shown in FIG. 4 includes a process of forming coating-layers 25, 25 composed of Sn or a Sn alloy by a process of an electroplating on the surface of the base 22 on which projections 24g, 24g are formed preliminarily, particularly, on the face in contact with an electrode.

In case of FIG. 4, the separator base 22 and the projections 24g, 24g may satisfactorily be moldings composed of the same material (for example, a cast metal plate or a forged plate composed of stainless steel, Al or the like). Alternatively, the separator base 22 may satisfactorily be composed of stainless steel and the projections 24g, 24g may satisfactorily and specially be composed of Cu, Al or the like. The coating-layers 25 are then formed on the surface of the projections 24g, 24g.

In this case, when a coating-layer composed of a Sn—Bi alloy is to be formed on a projection surface of a separator base, a Sn—Bi alloy may satisfactorily be formed by a process of a hot-dipping, an electroplating, or the like. In case of an electroplating, however, a porous layer has to be dense by reflowing a plating-layer. The reason why is that if it is porous, as it is, then oxidation of a substrate is promoted due to penetration of water vapor under the cell-operation, thereby resulting in the increase of the contact resistance. Alternatively, Sn and Bi may satisfactorily be plated in order, then being reflowed to allow the metal plating to be dense and to be rationalistic simultaneously. At this time, the order of a Sn plating and a Bi plating does not matter.

Furthermore, when the separator 20d shown in FIG. 5 is to be produced, then a plating may also be employed in order to form the coating-layers 25a, 25a on a part in contact with the projections 15, 15 which are formed on the surface of the electrode of the separator base.

In this case, firstly, the surface of the separator base except the part in contact with the electrode is masked, then immersed in the electroplating bath and electroplated as described above, whereby the separator on which the coating-layers 25a, 25a are formed is produced.

Hereinafter, a description of several experiments will now be given.

EXAMPLE 1

A pure Sn plate and a thin stainless steel plate that are coated with Ni on which a Sn layer was formed by using several processes, were exposed to a water vapor atmosphere; whereby a surface of the thin plate was made to be oxidized; then under that state, change with increasing time of the contact resistance thereof was examined. Addition to a pure Sn, the employed test specimens were following: a thin stainless steel plate with a Sn-plated layer prepared by immersing in a molten-Sn bath (referred to as "a molten Sn-plating" hereinbelow), a thin stainless steel plate with a Sn-electroplated layer having a thickness of 1.5 $\mu$m prepared by electroplating and then reflowing (referred to as "a Sn plating-reflowing" hereinbelow), a thin stainless steel plate with a Sn-electroplated layer having a thickness of 1.5 $\mu$m and a thin stainless steel plate with a Sn electroplated layer having a thickness of 0.5 $\mu$m prepared by electroplating (referred to as respectively "a Sn (1.5 μm) plating" and "a Sn (0.5 μm) plating" hereinbelow), and a thin stainless steel plate with a clad Sn layer having a thickness of 10 μm prepared by cladding (referred to as "a Sn (10 μm) cladding" hereinbelow).

Figure 13:
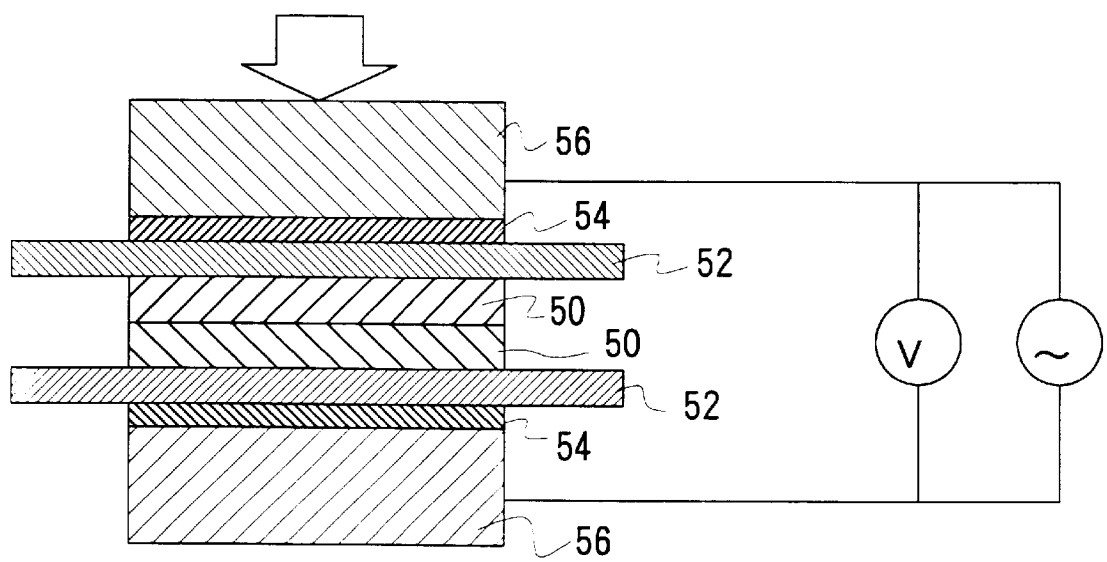
FIG. 13 shows a schematic view of the apparatus for measuring the contact resistance of several kinds of materials for a separator.

These thin plates were exposed to a water vapor atmosphere under conditions of temperature of 60° C.×humidity of 100%, then each contact resistance was measured to examine change with increasing time. Contact resistance was measured by the following procedures, with using the apparatus shown in FIG. 13. More specifically, two sheets of carbon cloths 50 having a cross section of 20 mm×20 mm were laterally put between two test specimens 52, 52, then were vertically put between two Cu blocks 56, 56, one face of which is coated with Ag paste 54.

Then, AC voltage was applied to the Cu blocks 56, 56 in a state that a load of approximately 11 kg/cm² was loaded thereon, then contact resistance between the carbon cloth 50 and the test specimen 52 was measured. Herein, three kinds of data, namely, before the water vapor exposure test, after the exposure of 24 hours, and after the exposure of 96 hours, were measured for respective test specimens.

Comparative Example 1

Following the same procedures as in Example 1, except for the use of test specimens of a thin stainless steel plate with a Ni plated layer having a thickness of 2 μm (referred to as "a Ni (2 μm) plating" hereinbelow), and except for the use of a separator material of a dense carbon graphite plate in conventional use (simply referred to as "a carbon plate" hereinbelow), the contact resistance between the carbon cloth and the test specimen was measured.

Figure 14:
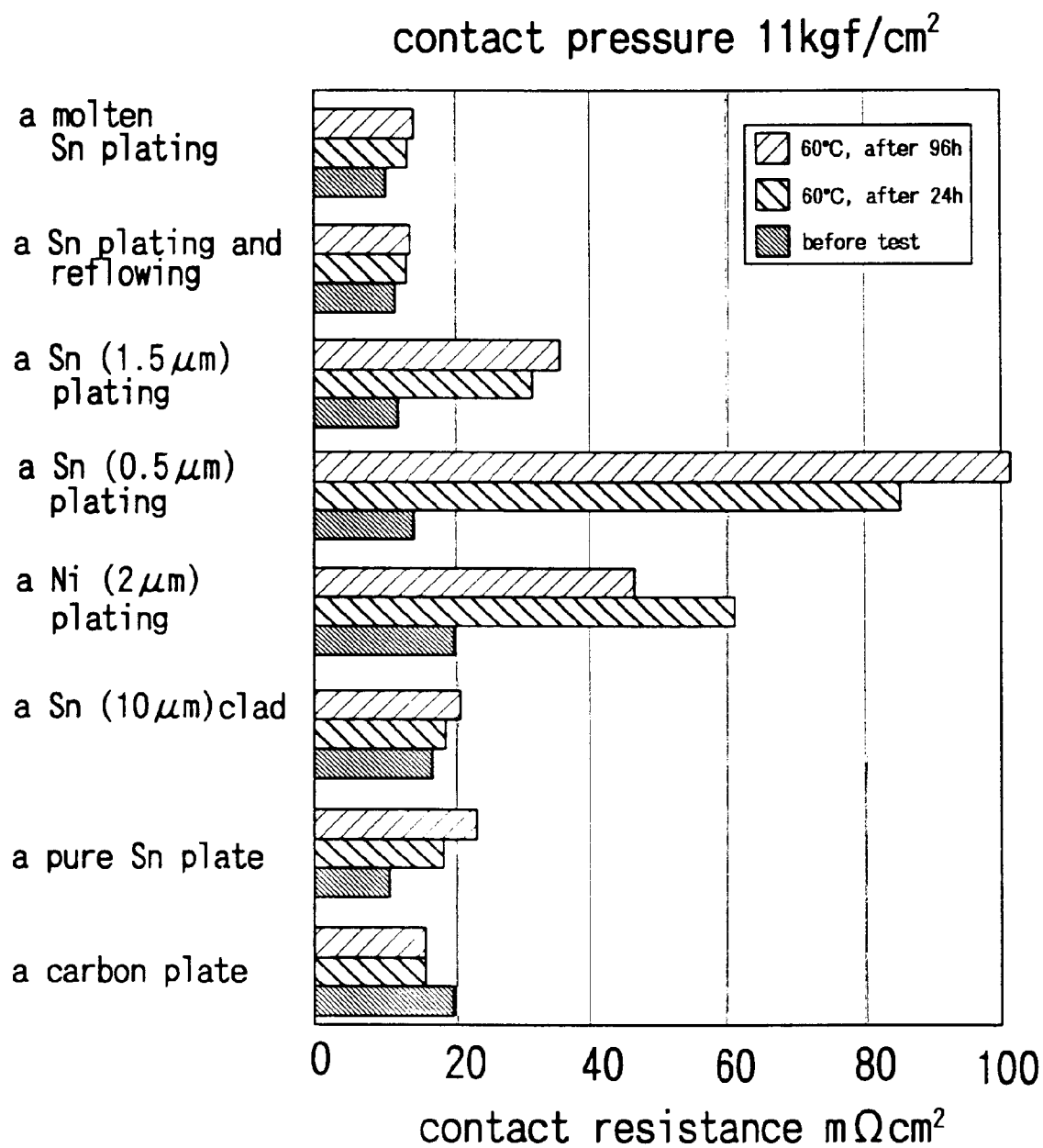
FIG. 14 shows bar graphs showing the contact resistance of the various Sn-plated materials, a Ni-plated material, a Sn-clad material, a pure Sn plate and a carbon plate, before and after the water vapor exposure test.

FIG. 14 shows the contact resistance measured in Example 1 and Comparative Example 1. In case of a carbon plate, the contact resistance was 20 mΩcm² before the water vapor exposure test, but it was 16 mΩcm² after the water vapor exposure of 96 hours under a water vapor atmosphere of 60° C. This fact indicates that the contact resistance was stably maintained at low levels even under an oxidizing water vapor atmosphere.

On the contrary, in case of a Ni (2 μm) plating, the contact resistance was 20 mΩcm² before the exposure test, showing the same value as a carbon plate; but it elevated to 45 mΩcm² after the water vapor exposure of 96 hours. The reason is considered due to the fact that an oxide film formed on a Ni surface causes the increase of the contact resistance.

Alternatively, in case of a molten Sn plating, the contact resistance was 10mΩcm² before the water vapor exposure test, and it was 15 mΩcm² or less even after the water vapor exposure of 96 hours, therefore, a molten Sn plating showed a lower contact resistance than that of a carbon plate. In case of a Sn (10 μm) clad and a pure Sn plate, the contact resistance was higher than a molten Sn plating, but after the water vapor exposure of 96 hours, they were 20 to 24 mΩcm², thereby being equal to that of a carbon plate.

On the contrary, in case of a Sn (1.5 μm) plating and a Sn (0.5 μm) plating, the contact resistance was a low value of 15 mΩcm² or so before the water vapor exposure test. However, the contact resistance of a Sn (1.5 μm) plating elevated to 35 mΩcm², and that of a Sn (0.5 μm) plating was over 100 mΩcm². Alternatively, in case of a Sn plating-reflowing prepared by reflowing a Sn layer formed in a process of an electroplating, after the water vapor exposure of 96 hours, the contact resistance was as low as that of a molten Sn plating.

The reason was that a Sn-plated layer formed by an electroplating was porous, therefore, a Sn layer became thinner and thinner, then water vapor was likely to penetrate through an interface between a Sn-plated layer and stainless steel, whereby stainless steel at a vicinity of the interface was oxidized.

Based on the aforementioned results, it is indicated that the contact resistance of Sn showed little change even if the Sn was exposed under a water vapor atmosphere for a long time, thus achieving satisfactorily a low and stable contact resistance, compared with a carbon plate for a conventional use of a separator material, whereby Sn was preferable as a material of a projection formed on a surface of a separator base.

EXAMPLE 2

Following the same procedures as in Example 1, except for the use of test specimens of a thin stainless steel plate with a Sn-3% Bi alloy layer by a process of a hot-dipping (referred to as "a Sn-3% Bi" hereinbelow), and except for the use of test specimens of a thin stainless steel plate with a Sn-10% Bi alloy layer by a process of a hot-dipping (simply referred to as "a Sn-10% Bi" hereinbelow), the contact resistance between the carbon cloth and the test specimen was measured.

Figure 15:
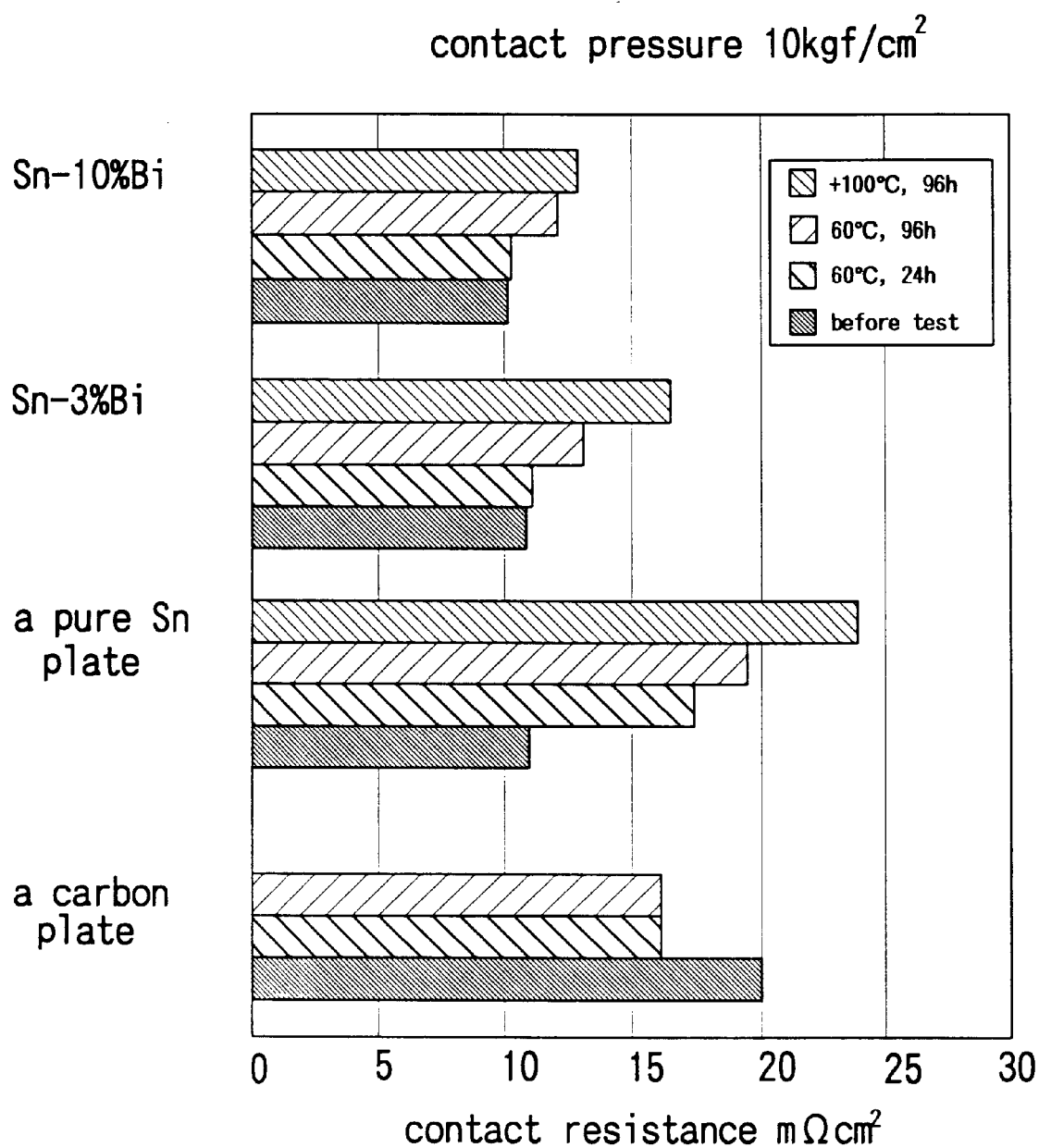
FIG. 15 shows bar graphs showing the contact resistance of a Sn—Bi alloy plated material, a pure Sn plate and a carbon plate, before and after the water vapor exposure test.

The above-mentioned test specimens after the water vapor exposure of 96 hours under a condition of temperature of 60° C. were further exposed to a water vapor atmosphere under conditions of temperature of 100° C.×humidity of 100%, then each contact resistance with a carbon cloth was measured. Its results are shown in FIG. 15. Additionally, for comparison, FIG. 15 also shows the contact resistance of a pure Sn plate and a carbon plate, measured respectively in processes of Example 1 and Comparative Example 1.

As shown in FIG. 15, in case of the stainless steel coated with a Sn—Bi alloy, the contact resistance before the water vapor exposure test was lower than that of a carbon plate, similar to that of a pure Sn plate. Furthermore, after the exposure of 96 hours under 100° C., the contact resistance of a pure Sn plate was 24 mΩcm², alternatively, that of a Sn-3% Bi lowered to 17 mΩcm², furthermore, that of a Sn-10% Bi lowered to 13 mΩcm².

Based on the aforementioned results, it is indicated that under an oxidizing water vapor atmosphere, a Sn—Bi alloy showed the higher stability than Sn, and its contact resistance with a carbon cloth was likely to be small at larger Bi content.

Figure 16:
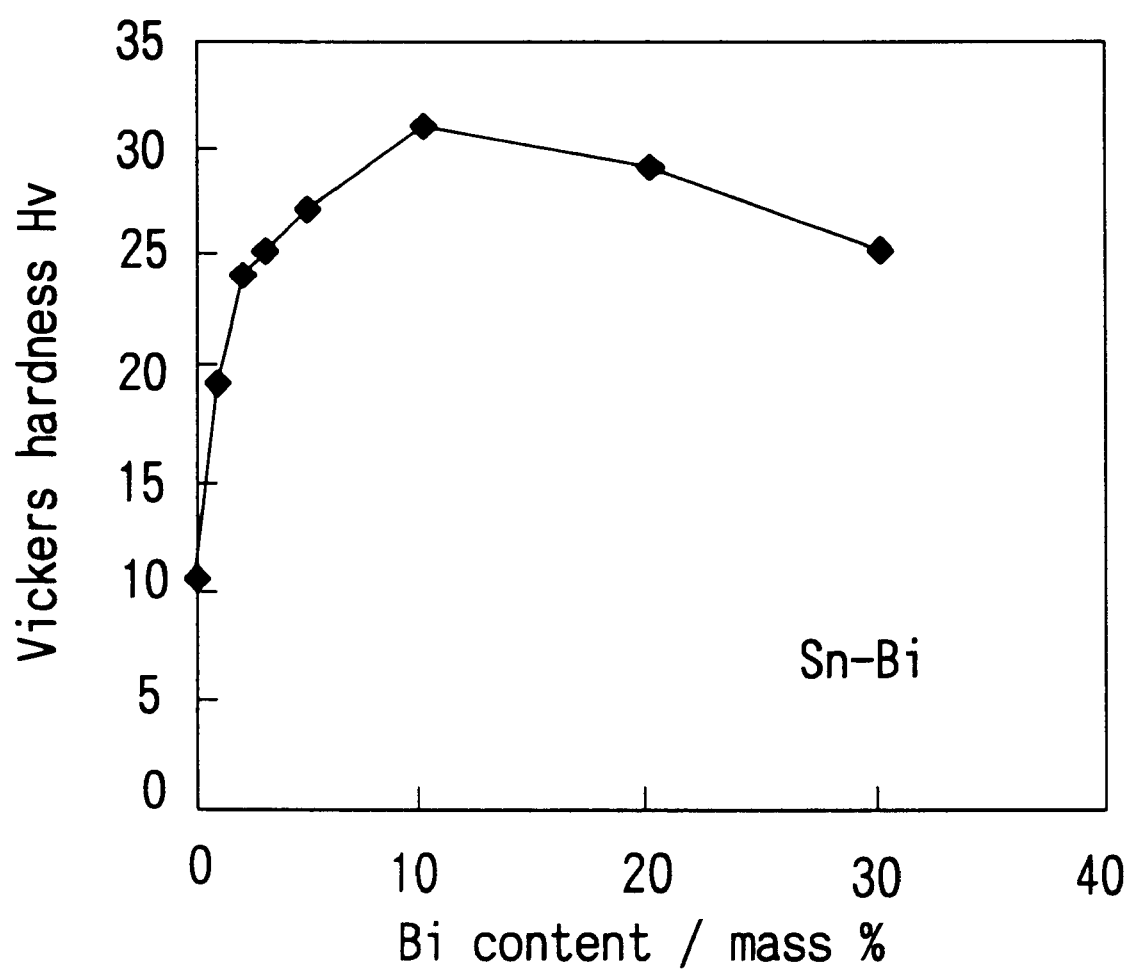
FIG. 16 shows a graph depicting the relation between Bi content and hardness of a Sn—Bi alloy.

As shown in FIG. 16, hardness of a Sn—Bi alloy shows a maximum value at Bi content of 10%. In consideration of application to a solid polymer fuel cell separator, the operation temperature of the fuel cell is 100° C. or so. Furthermore, a separator is fastened with unit cells in layers by a given power, therefore, a projection formed on a separator needs a certain measure of rigidity. Taking account of aforementioned points, it is considered that Bi content is preferably within a range of 3 to 20%, so as to form a projection using a Sn—Bi alloy on a surface of a separator.

Comparative Example 2

Figure 17:
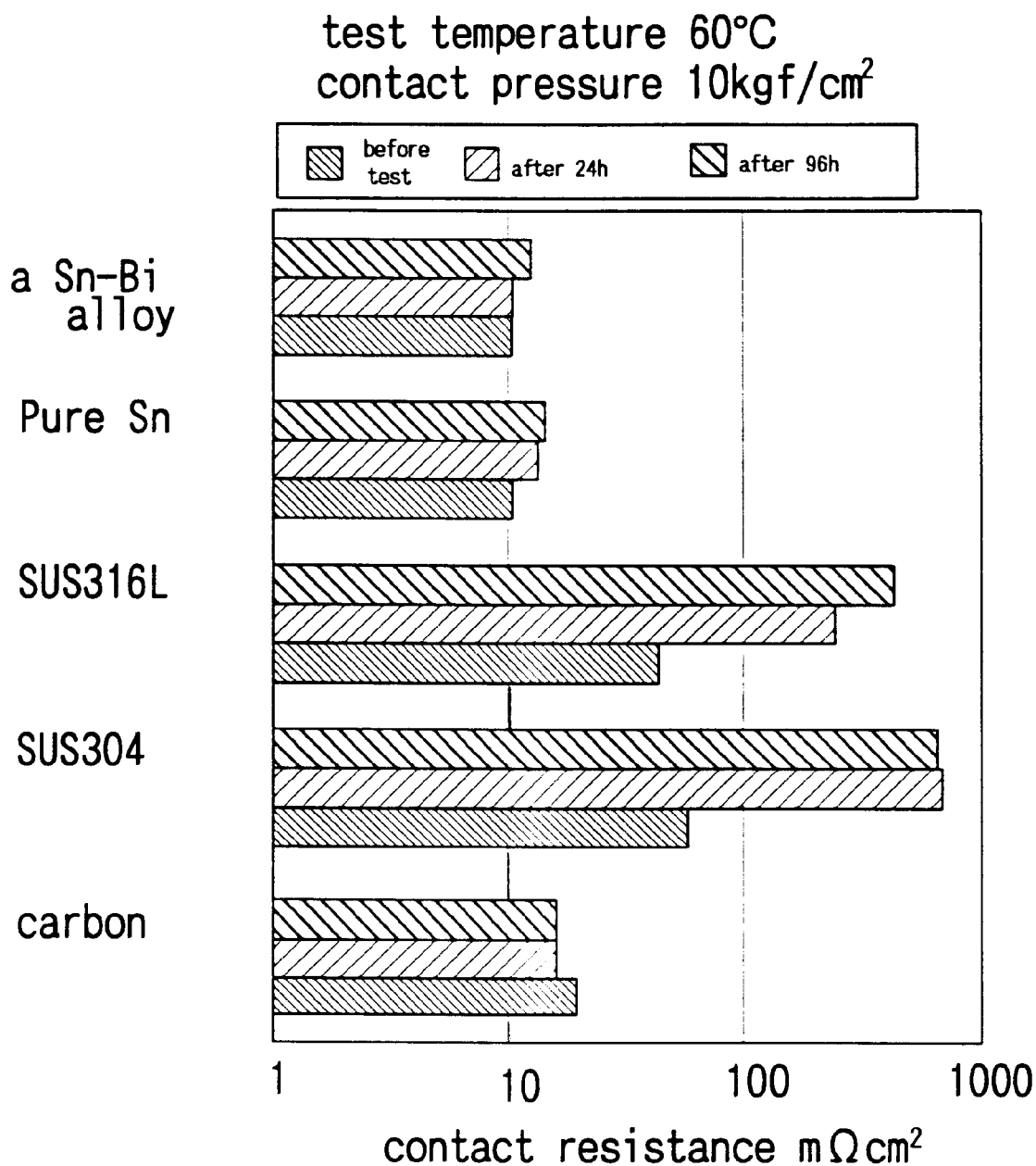
FIG. 17 shows bar graphs showing the contact resistance of a Sn-10% Bi alloy plated material, a pure Sn plate, SUS316L, SUS304 and a carbon plate, before and after the water vapor exposure test.

Following the same procedures as in Example 1, except for the use of test specimens of SUS316L (JIS) and SUS304 (JIS) with no plated layer thereon, the contact resistance between the carbon cloth and the test specimen was measured. Its results are shown in FIG. 17. Additionally, for comparison, FIG. 17 also shows the contact resistance of a pure Sn plate and a carbon plate measured in a process of Example 1, and of a Sn-10% Bi alloy measured in a process of Example 2.

As shown in FIG. 17, in case of SUS316L or SUS304 with no plated layer thereon, the contact resistance was several tens mΩcm², thus indicating higher than that of a pure Sn plate or of a Sn-10% Bi alloy. Furthermore, after the exposure of 96 hours under an oxidizing vapor atmosphere of temperature of 60° C., it was indicated that the contact resistance elevated to several hundreds mΩcm². The reason was that an oxide film having the low conductivity was formed on SUS316L or SUS304 due to the exposure to an oxidizing water vapor atmosphere.

EXAMPLE 3

Figure 18:
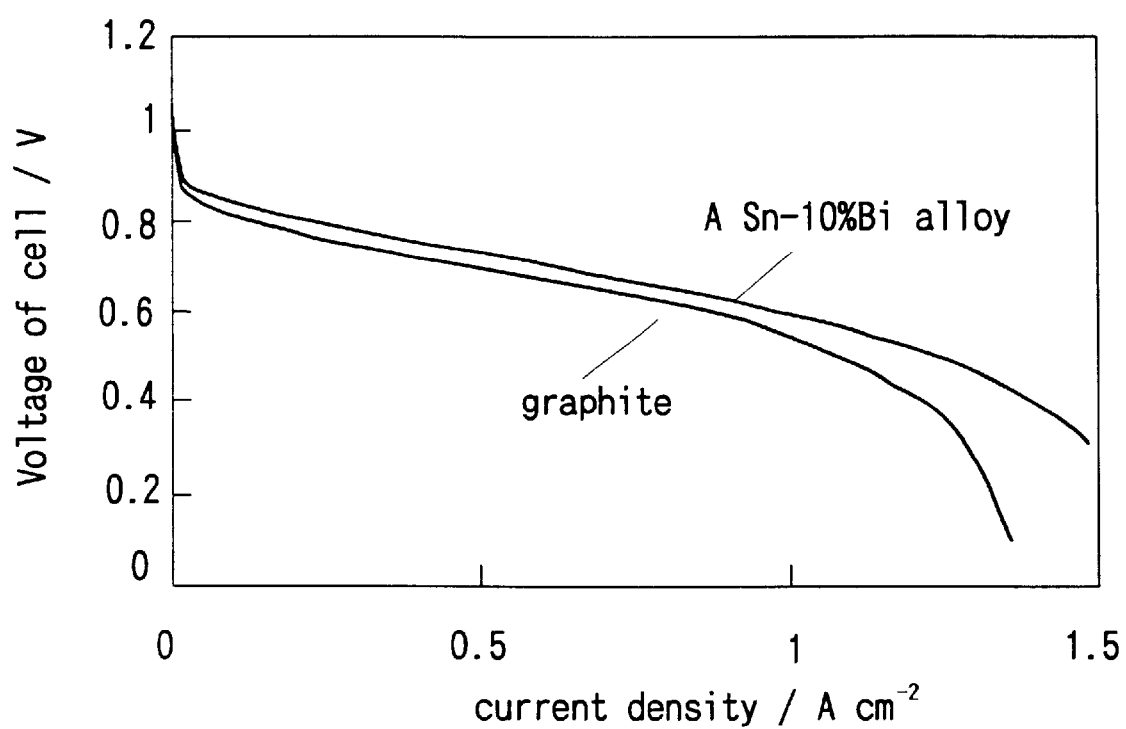
FIG. 18 shows graphs depicting the cell performance of the fuel cell using such separator as to have projections composed of a Sn-10% Bi alloy, and that of the fuel cell using a separator made of dense carbon graphite.

A stainless steel with a Ni plated layer was employed as a base, and a Sn-10% Bi alloy was employed as a material of a projection, then a fuel cell separator was produced following the same procedures as in the first producing method. By using the resulting fuel cell separator, a prototype of a solid polymer fuel cell was produced, then the performance of the fuel cell was appreciated. Conditions of anode were as follows: $H_2$—2 atm, a flow rate of 38 ml/min·cm², 0.5 L/min, a humidifier temperature of 85° C.; conditions of cathode were as follows: air—2 atm, a flow rate of 77 ml/min·cm², a humidifier temperature of 70° C.; a cell temperature was set to be 80° C. Additionally, a thickness of an electrolyte membrane in the fuel cell was 100 μm. Its results are shown in FIG. 18. Additionally, FIG. 18 also shows the performance of a fuel cell produced by using dense carbon graphite as a material of a separator.

According to FIG. 18, it is indicated that a fuel cell produced by using a fuel cell separator having a stainless steel base on which a projection composed of a Sn-10% Bi alloy is formed, shows the higher performance than a fuel cell produced by using a fuel cell separator made of dense carbon graphite, therefore a Sn-10% Bi alloy has the excellent current-collecting performance.

Next, FIG. 19 to FIG. 23 show the test results with respect to three kinds of materials: an alloy prepared by adding 0.5 wt % of Ag to a Sn-10% Bi alloy (Sn-10Bi-0.5Ag), an alloy prepared by adding 1 wt % of Ag to a Sn-10% Bi alloy (Sn-10Bi-1Ag), and an alloy prepared by adding 2 wt % of Ag to a Sn-10% Bi alloy (Sn-10Bi-2Ag).

Figure 19:
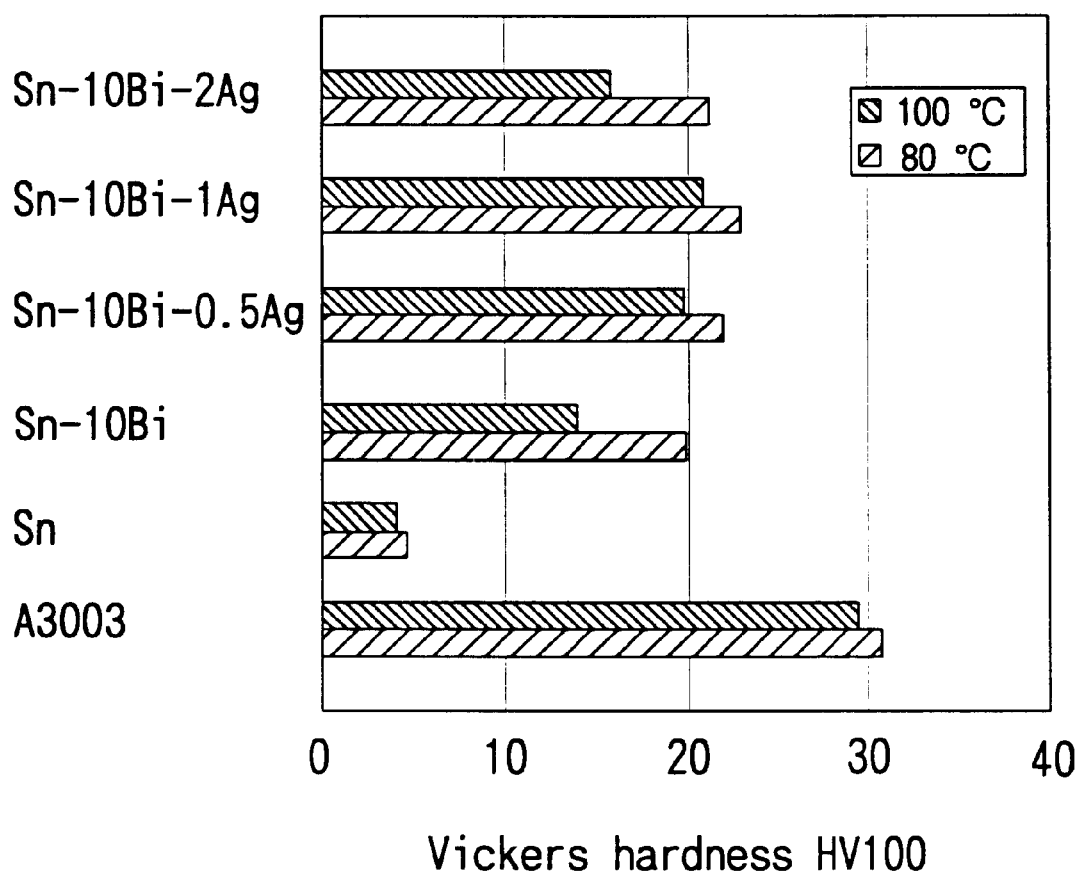
FIG. 19 shows bar graphs showing the measured results of hardness of a Sn-10% Bi alloy material.

Firstly, FIG. 19 illustrates the measured results for each material showing Vickers hardness Hv at 80° C. and 100° C. within the operation temperature of the cell. Addition to aforementioned three kinds of examples (Sn-10Bi-0.5Ag, Sn-10Bi-1Ag, Sn-10Bi-2Ag), following were employed as the test specimen as comparative examples: a pure Sn plate, a Al plate (A3003 material) and a Sn-10% Bi alloy (not adding Ag).

As a result, all of three kinds of examples showed a higher Vickers hardness Hv at 80° C. and 100° C. within the operation temperature of the cell, as compared with a Sn-10% alloy to which no Ag was added. This fact indicated that to apply a material prepared by adding Ag to a Sn-10% Bi alloy as a projection of a fuel cell separator caused rigidity (the creep strength) of a material to be higher. Additionally, there were little difference among Vickers hardness Hv due to changing an addition amount of Ag to a Sn-10% Bi alloy from 0.5 wt %, 1 wt % to 2 wt %; however, the efficiency of addition of Ag were satisfactorily recognized even though an addition amount of Ag was a little such as 0.5 wt % or 1 wt %.

Figure 20:
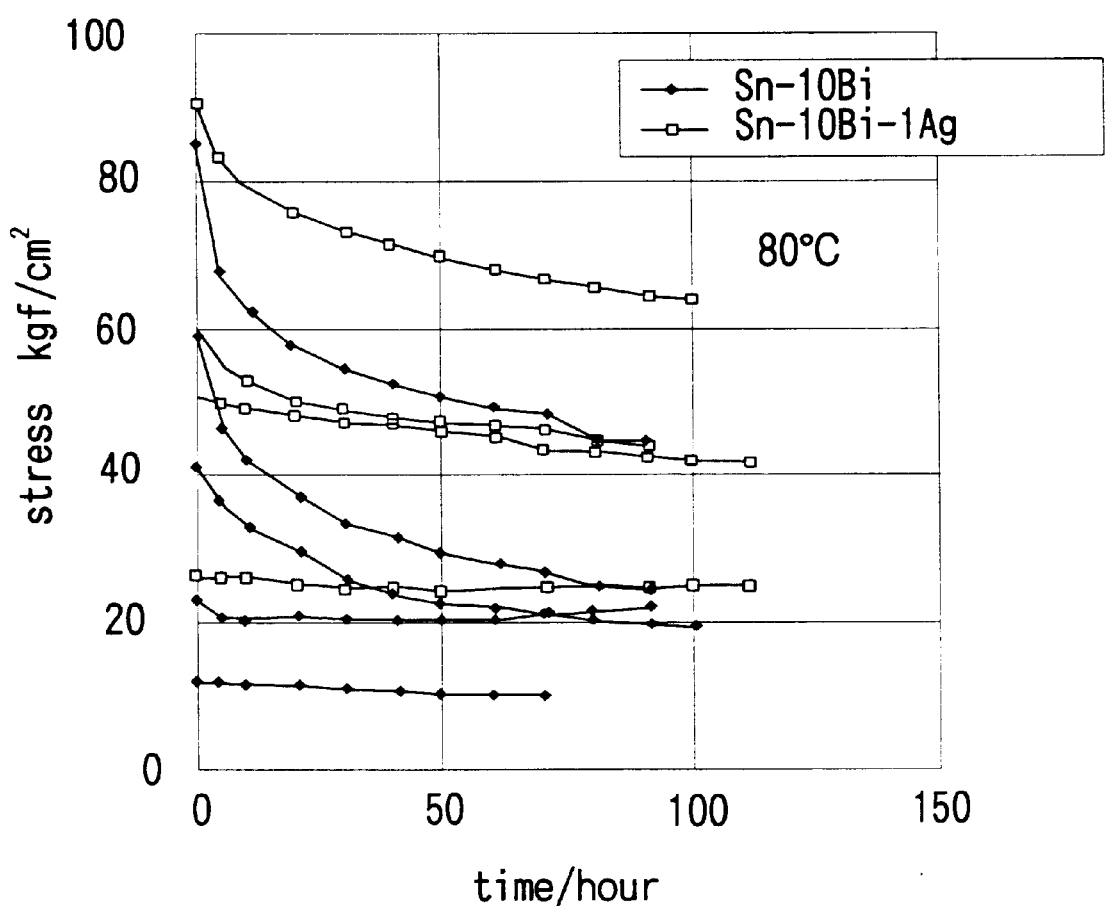
FIG. 20 shows graphs depicting the creep strength in a high temperature under a condition of 80° C. with respect to the same material shown in FIG. 19.

Next, FIG. 20 illustrates the examined results showing the creep performance held at high temperature of 80° C. within the operation temperature of a fuel cell. Shown comparable data were of a Sn-10% Bi alloy (no Ag added) and a material prepared by adding 1 wt % of Ag to a Sn-10% Bi alloy (Sn-10Bi-1Ag). Four kinds of initial stress were loaded on a test specimen under a condition of 80° C. in order to pressurize and constrain the test specimen; they were respectively 80 kgf/cm², 60 kgf/cm², 40 kgf/cm² and 20 kgf/cm². A time (hour) after applying stress is plotted on a horizontal axis, and a variation of stress (the creep strength) is plotted on a vertical axis.

As a result, in case of 20 kgf/cm² of an initial stress, all of the test specimens show little change in the creep strength with increasing time; but an initial stress was elevated to 40 kgf/cm², 60 kgf/cm², and 80 kgf/cm², then a Sn-10% Bi alloy (no Ag added) showed larger change in the creep strength at the higher initial strength than a Sn-10Bi-1Ag alloy (Ag added); namely, a Sn—10Bi-Ag alloy showed smaller change in the creep strength. It was confirmed that a Sn-10Bi-Ag alloy had more excellent high-temperature creep performance than a Sn-10% Bi alloy.

Figure 21:
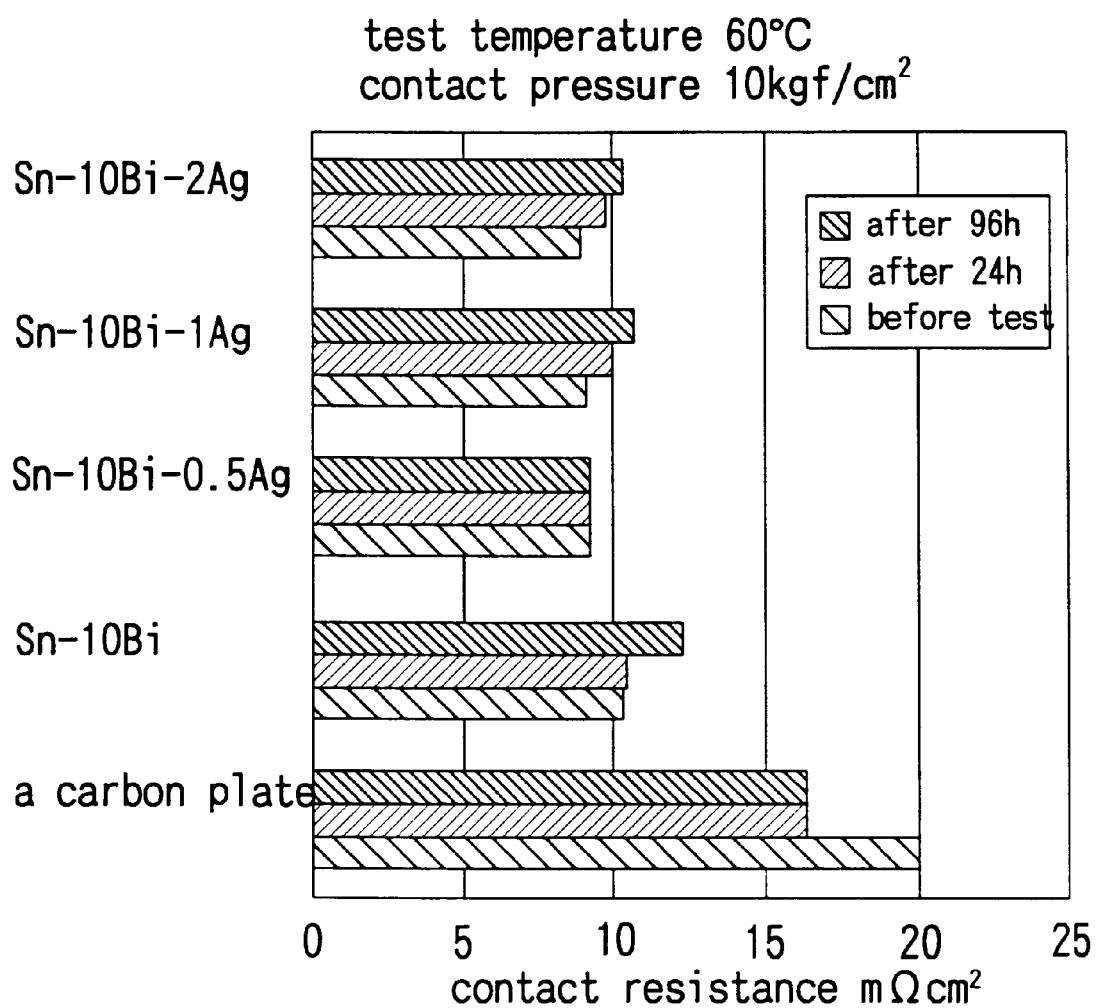
FIG. 21 shows bar graphs showing the contact resistance between a separator and an electrode with respect to the same material shown in FIG. 19, before and after the water vapor exposure test under a condition of 60° C.

Next, FIG. 21 shows the contact resistance (mΩcm²) after the water vapor exposure test in respect with three kinds of examples: a Sn-10Bi-0.5Ag alloy, a Sn-10Bi-1Ag alloy and a Sn-10Bi-2Ag alloy; they are shown in comparison with a Sn-10% Bi alloy (no Ag added) and a carbon plate (a dense carbon graphite plate). By using the apparatus shown in FIG. 13, the contact resistance of each test specimen was measured before the water vapor exposure test, after the exposure to water vapor under conditions of 60° C.×24 hours, and after the exposure to water vapor under conditions of 60° C.×96 hours.

As a result, it was indicated that three kinds of examples (Ag added) showed lower contact resistance than a Sn—Bi alloy to which no Ag is added, at following all stages: before the water vapor exposure test, after the exposure to water vapor under conditions of 60° C.×24 hours, and after the exposure to water vapor under conditions of 60° C.×96 hours. This fact suggested that there were no problem to use a material prepared by adding Ag to a Sn—Bi alloy as an alloy material of a projection, so as to lower the contact resistance between a separator and an electrode surface.

Figure 22:
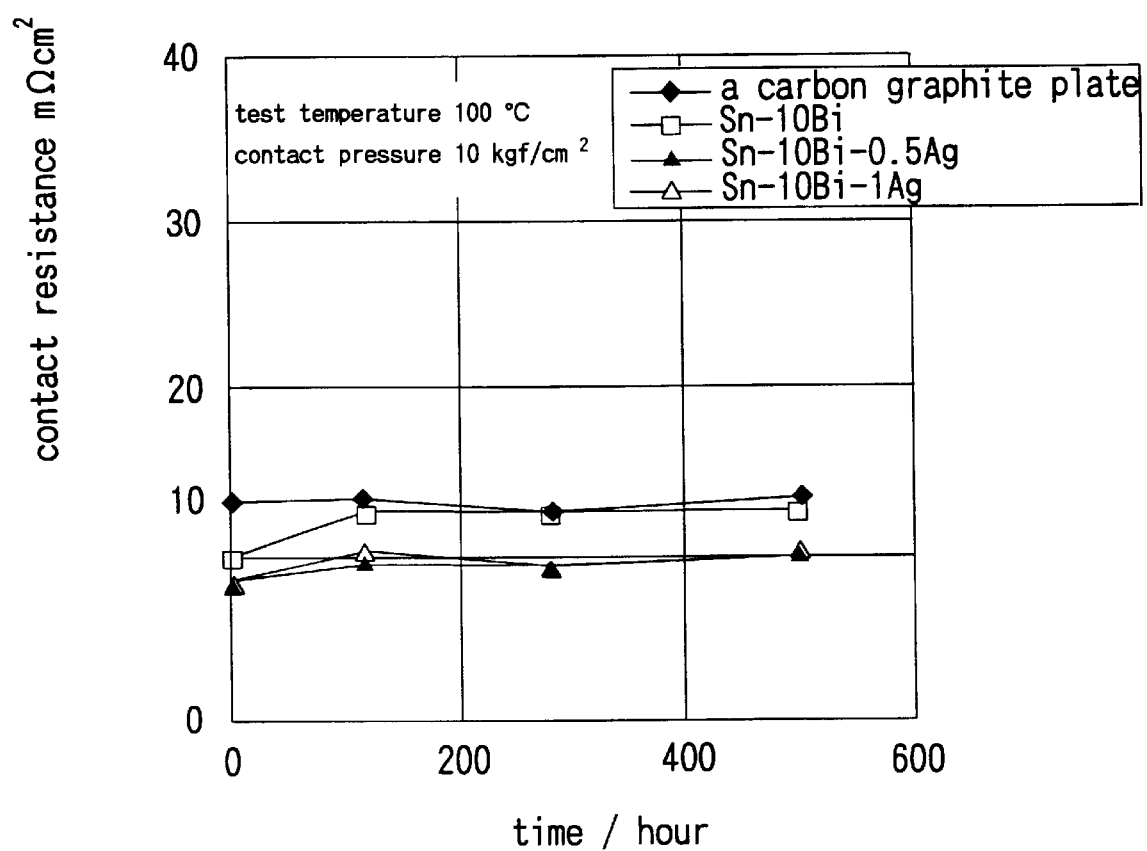
FIG. 22 shows graphs depicting change with increasing time of the contact resistance with respect to the same material shown in FIG. 19, in the water vapor exposure test under a condition of 100° C.

Then, FIG. 22 illustrates change with increasing time in the contact resistance between a separator and an electrode surface of Examples (Ag added) under conditions of the exposure test temperature of 100° C.×a contact pressure of 10 kgf/cm², in comparison with a Sn-10% Bi alloy (no Ag added). As examples, there are shown two kinds of alloys: a Sn-10Bi-0.5Ag alloy and a Sn-10Bi-1Ag alloy; furthermore, as comparative examples, there are also shown a carbon graphite plate in addition to a Sn-10% Bi alloy (no Ag added).

As a result, it was indicated that all examples, namely, a Sn-10Bi-0.5Ag alloy and a Sn-10Bi-1Ag alloy, showed lower contact resistance than a carbon graphite plate and a Sn-10% Bi alloy. This fact suggested that more excellent cell performance would be achieved, by using a Sn—Bi alloy to which Ag added, as a projection of a separator.

Figure 23:
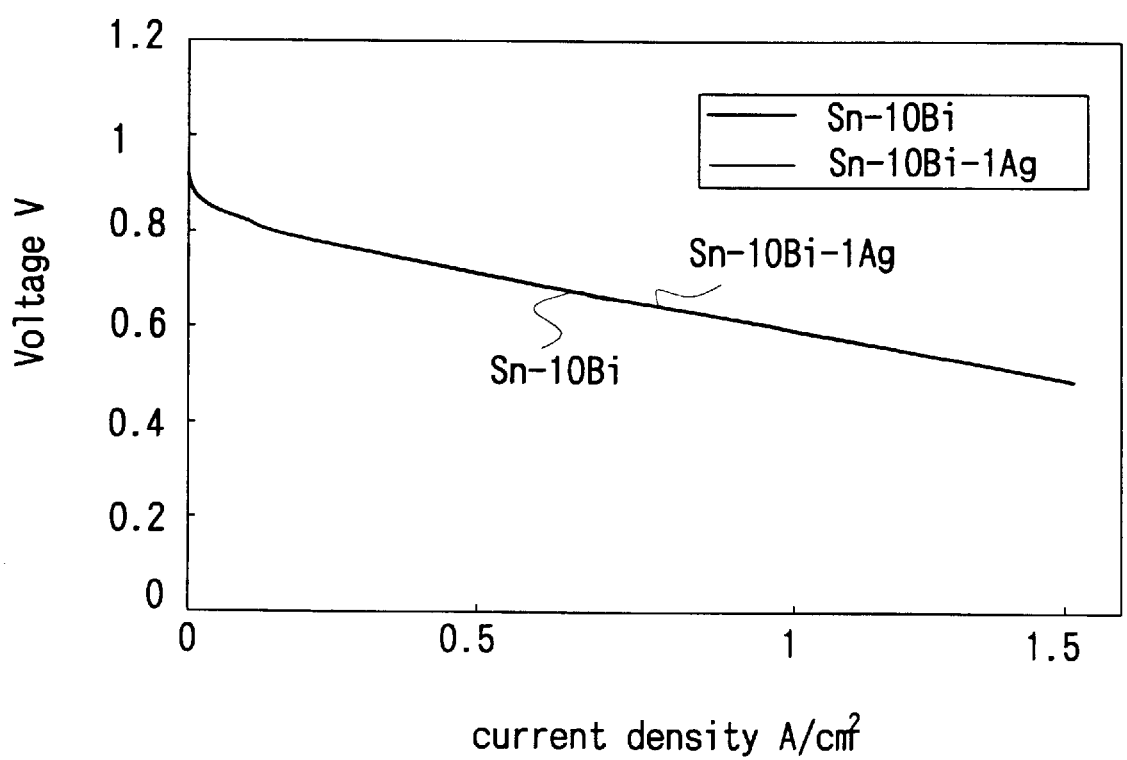
FIG. 23 shows a graph depicting the performance of the fuel cell produced by using the same material shown in FIG. 19.

Then, FIG. 23 shows results of the fuel cell performance comparative test. Shown comparable test specimens are following: one is the stainless steel separator base with Ni-plated layer on which projections composed of a Sn-10% Bi alloy (no Ag added) are formed, and the other is the stainless steel separator base with Ni-plated layer on which projections composed of a Sn-10% Bi-1Ag alloy are formed. An anode condition, a cathode condition and the cell temperature were determined as the same as the case shown in FIG. 18. The test shown in FIG. 23, however, differs from the test shown in FIG. 18 in a thickness of 30 μm of an electrolyte membrane (in case of FIG. 18, it is 100 μm).

In either case, in point of the fuel cell performance, it was confirmed that the test specimen with a projection composed of a Sn-10Bi-Ag alloy could stand comparison with the test specimen with a projection composed of a Sn-10% Bi alloy (no Ag added). Furthermore, taking account of data shown in FIG. 18, it is indicated that the Example employing a Sn-10Bi-Ag has more excellent current-collecting performance than a fuel cell provided with a separator made of dense carbon graphite, thus achieving the high performance as a fuel cell.

EXAMPLE 4

By using an Al-Mn alloy plate (material: JIS A3003) having a size of 50 mm×50 mm and a thickness of 0.3 mm, as a base, a simulated separator was produced by a process of a press forming. At a central part having a size of 36.5 mm×36.5 mm on the simulated separator, a great number of projections having a size of 1.0 mm×1.0 mm and a height of 0.5 mm were formed at a pitch of 2 mm. Then, a process of coating the surface with a Sn alloy was carried out by the following procedures. As a process of plating a substrate, firstly, an electroless Ni—P plating (a commercial bath) having a thickness of 5 μm was carried out on an aforementioned pressed-Al plate; successively, an electroplating (commercial bath) having a thickness of 0.5 μm was carried out thereon. Among them, the first one was immersed in a Sn-10% Bi alloy bath which was molten and held at 260° C.; then was pulled up and air-cooled; whereby the separator with a Sn-10% Bi molten plated layer having a thickness of 50 μm of the present invention was prepared. By using a Sn—Bi alloy electroplating bath (a commercial goods), the second one was prepared by electroplating so as to form a Sn-10% Bi alloy layer having a thickness of 10 μm thereon. The third one was prepared by following procedures: a Sn—Bi electroplating was carried out as the same as the second one; then it was immersed in an oil (a water soluble and high boiling oil) which was heated to and held at 260° C. and then the Sn—Bi alloy plated layer was reflowed; after that it was pulled up to remove an oil; whereby the separator of the present invention was prepared. The fourth one was prepared by following procedures: an electroless Ni—P plating was carried out as a substrate plating; then a Sn electroplating (a commercial bath) having a thickness of 10 μm was carried out; furthermore, a Bi electroplating (prepared by using a Bi nitrate reagent) having a thickness of 0.8 μm immersed; then a reflow process similar to the third one was carried out; whereby the separator of the present invention with a Sn-10% Bi alloy coating layer was prepared. As comparative examples, an aforementioned Al plate on which projections were formed by a process of a press forming, and the same on which an aforementioned electroless Ni—P plating were only applied, were prepared. Following the same procedures as in Example 1, the exposure test was carried out under temperature of 60° C. in a water vapor atmosphere, and contact resistance with a carbon cloth was measured.

Figure 25:
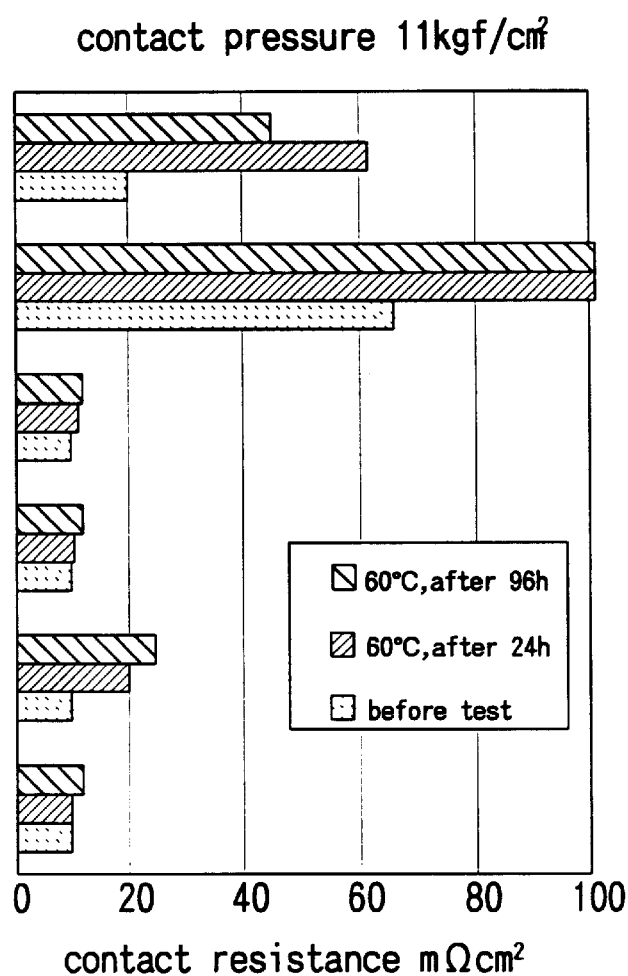
FIG. 25 shows bar graphs showing the contact resistance of a Ni—P plated material, a press forming material, a material prepared by electroplating Sn and Bi and then reflowing, a material prepared by electroplating a Sn-10% Bi alloy and then reflowing, a Sn-10% Bi alloy electroplating material, a Sn-10% Bi alloy molten plating, before and after the water vapor exposure test.

Its results are shown in FIG. 25. In case of a test specimen processed by a hot-dipping, the contact resistance was almost equal to a test specimen with a Sn-10% Bi alloy on stainless steel in Example 2 prepared by a hot-dipping. On contrast, in case of a test specimen with a layer formed by electroplating, the contact resistance after a long time exposure test was more than twice as high as the contact resistance before the exposure test, due to the long time exposure. By causing a plated layer to be dense by a process of reflowing, however, the electroplated one became almost as the same as one prepared by a hot-dipping. Additionally, a test specimen prepared by plating Sn and Bi separately, and then causing to be dense and to form an alloy simultaneously by a process of reflowing also showed almost the same levels. In case of a single Al plate and a test specimen processed by a Ni—P plating, prepared as Comparative Examples, the contact resistance increased remarkably due to the long exposure test.

The present invention may be embodied in other specific forms without departing from the spirit or essential characteristics thereof. For instance, a plurality of isolated projections are formed on a base in the shape of a flat plate in the embodiments described above, but the combined projections may satisfactorily be formed on the base in stead of the isolated projections.

Additionally, in the embodiments described above, projections composed of Sn or a Sn alloy are formed on a surface of the base in the shape of a flat plate. Alternatively, projections may satisfactorily be formed by forming projections and recesses on both faces of a flat-shaped base by a process of a press forming or the like; th en making whole of the projections thicker by coating them with Sn or a Sn alloy, whereby the same effects as in the above embodiments can be exerted.

Furthermore, in the embodiments described above, a Sn—Bi alloy is enumerated for an example of a Sn alloy, but it is not limited thereto. As a material which has the corrosion resistance and a heat resistance and has the contact resistance which shows little change with increasing time, the following materials are listed up as described above: a Sn—Ni alloy, a Sn—Fe alloy, a Sn—Ti alloy, a Sn—Ag alloy, a Sn—Sb alloy, a Sn—In alloy, a Sn—Zn alloy, or the like. Moreover, among several kinds of Sn—Bi alloys, an embodiment prepared by adding Ag is only enumerated so as to improve the high-temperature creep performance. As described above, however, such a material that forms an intermetallic compound in a Sn matrix and causes the creep performance to be improved, may satisfactorily be used, therefore, Cu, Al, Sb or the like may satisfactorily be added instead of, or together with Ag. Furthermore, In or the like, which improves the corrosion resistance, can be added and used together with these metals.

According to the fuel cell separator of the present invention, the contact resistance can be maintained at a low level even if the separator is driven under an oxidizing water vapor atmosphere for a long time; because a contact part, which is arranged on a facing plane between a separator base and an anode or a cathode, for use in contact current-collection and for forming gas passages, is composed of Sn or a Sn alloy.

Particularly, by composing the contact part of a Sn—Bi alloy, change with increasing time becomes smaller and smaller under an oxidizing water vapor atmosphere, therefore, the contact resistance can effectively be maintained at a low level for a long time. In this case, a material prepared by adding Ag to a Sn—Bi alloy can maintain the creep strength at a high level even under a high temperature over 80° C., whereby the excellent cell performance can be shown continuously in a state of a high contact pressure. Additionally, a seal pressure at a gas seal portion is maintained at a high level, and troubles such as a gas leakage or the like can be avoided, whereby safety upon a cell operation can be secured.

Furthermore, according to the method for producing a fuel cell separator of the present invention, a plurality of contact parts for use in contact current-collection and for forming gas passages can readily be formed at a time on a surf ace of a separator base by a process of a die press of a molten Sn or a molten Sn alloy; additionally, a fuel cell separator can effectively be produced at a low cost in comparison with a machine working and a die press; furthermore, a mass-production can effectively be possible.

Furthermore, according to the aforementioned producing method, different from a separator produced by using a conventional metal thin-plate prepared by a press forming, danger of a leakage of process gases can effectively be suppressed because a contact part itself is composed of Sn or a Sn alloy.

What is claimed is:

1. A fuel cell separator comprising a separator base and a contact part on a surface of said base, wherein said contact part has a contact face and is adapted for contacting and facing any one of electrodes, one of which is an anode formed on one side of a solid polymer electrolyte, and the other of which is a cathode formed on the other side of said solid polymer electrolyte, and for collecting current by making contact with said electrode and for forming gas passages, wherein said contact part comprises a Sn alloy containing Bi in the range of 3 to 20 wt %.

2. The fuel cell separator according to claim 1, wherein said Sn alloy additionally contains Ag in the range of 0.5 to 5 wt %.

3. The fuel cell separator according to claim 1, wherein said contact part comprises a plurality of projections, formed on a surface of said separator base.

4. The fuel cell separator according to claim 3, wherein said projections have a cylinder shape, a truncated cone shape, a hemisphere shape, or a rib shape.

5. The fuel cell separator according to claim 3, wherein an upper shape of said contact part is hemi-spherical or flat.

6. The fuel cell separator according to claim 4, wherein said projections have a diameter or a side in the range of 1 to 2 mm, and each space between each projection is in the range of 0.5 to 1.5 mm.

7. The fuel cell separator according to claim 4, wherein said projections have a ratio of a contact area defined by the sum of contact area between each projection and the electrodes/the area of the separator base, in the range of 25 to 50%.

8. The fuel cell separator according to claim 7, wherein said projections are of a height in the range of 0.2 to 1.0 mm.

9. The fuel cell separator according to claim 4, wherein said projections have a checkerboard arrangement on said separator base lengthwise and/or breadthwise.

10. The fuel cell separator according to claim 3, wherein at least the contact face of said projections comprises said Sn alloy, wherein the contact face is coated with said Sn alloy.

11. The fuel cell separator according to claim 1, wherein said separator base is of a flat-plate shape, and is adapted for contacting said electrode, wherein said electrode comprises projections or gaps on the side of said electrode to form a gas passage and wherein the contact face is coated with said Sn alloy.

12. The fuel cell separator according to claim 1, wherein said separator base comprises a material which is conductive and corrosion resistant.

13. The fuel cell separator according to claim 1, wherein said separator base comprises a material selected from the group consisting of stainless steel, Ti, Cu, Al and alloys thereof.

14. A method for producing a fuel cell separator comprising a separator base and a contact part on a surface of said base, wherein said contact part has a contact face and is adapted for contacting and facing any one of electrodes, one of which is an anode formed on one side of a solid polymer electrolyte, and the other of which is a cathode formed on the other side of said solid polymer electrolyte, and for collecting current by making contact with said electrode and for forming gas passages, comprising: forming a contact part comprising a Sn alloy containing Bi in the range of 3 to 20 wt % by a process of die working.

15. The method according to claim 14, comprising:

forming a layer of a molten Sn alloy on the surface of said separator; and pressing the layer of the molten Sn or the molten Sn alloy down by means of a die, said die having a cavity for forming gas passages, whereby said contact part being formed on the surface of said separator base.

16. The method according to claim 14, comprising:

forming a layer of a solid Sn alloy on the surface of said separator; and pressing the layer of the solid Sn alloy down by means of a die, said die being heated beforehand and having a cavity for forming gas passages; and reflowing said layer of the solid Sn alloy by utilizing heat of the die, whereby a contact part being formed on the surface of said separator base.

17. The method according to claim 14, comprising:

pouring the molten Sn alloy into a cavity of a die for forming gas passages; and pressing said separator base against said cavity of said die, whereby said contact part being formed on the surface of said separator base.

18. The method according to claim 14, comprising:

pressing said separator base against a cavity of a die for forming gas passages; and pouring molten Sn alloy into the cavity, whereby said contact part being formed on the surface of said separator base.

19. A method for producing a fuel cell separator comprising a separator base and a contact part on a surface of said base, wherein said contact part has a contact face and is adapted for contacting and facing any one of electrodes, one of which is an anode formed on one side of a solid polymer electrolyte, and the other of which is a cathode formed on the other side of said solid polymer electrolyte, and for collecting current by making contact with said electrode and for forming gas passages, comprising: forming a coating layer of a Sn alloy containing Bi in the range of 3 to 20 wt % on a surface of said contact part.

20. A method according to claim 19, said coating layer is formed by a hot-dipping or an electroplating.

21. A method according to claim 20, said electroplating is a Sn—Bi alloy plating or two layers-plating composed of a Sn plating and a Bi plating.

22. A method according to claim 20, further comprising: reflowing the surface of the coating layer after said electroplating.

* * * * *